(12) United States Patent
Noh et al.

(10) Patent No.: US 11,908,626 B2
(45) Date of Patent: Feb. 20, 2024

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Jung Eun Noh, Suwon-si (KR); Ji Hyuk Lim, Suwon-si (KR); Jong Yun Kim, Suwon-si (KR); Eun Jung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 140 days.

(21) Appl. No.: 17/372,828

(22) Filed: Jul. 12, 2021

(65) Prior Publication Data

US 2022/0093339 A1 Mar. 24, 2022

(30) Foreign Application Priority Data

Sep. 22, 2020 (KR) ........................ 10-2020-0122208

(51) Int. Cl.
*H01G 4/30* (2006.01)
*H01G 4/232* (2006.01)
(Continued)

(52) U.S. Cl.
CPC ............. *H01G 4/30* (2013.01); *C04B 35/468* (2013.01); *H01G 2/065* (2013.01); *H01G 4/008* (2013.01);
(Continued)

(58) Field of Classification Search
CPC .......... H01G 4/30; H01G 2/02; H01G 4/1218; H01G 4/248; H01G 4/012; H01G 4/1209;
(Continued)

(56) References Cited

U.S. PATENT DOCUMENTS 9,775,232 B2 * 9/2017 Park ..................... H01G 4/1227
2014/0104750 A1 * 4/2014 Ahn ......................... H01G 4/30
361/306.3

(Continued)

FOREIGN PATENT DOCUMENTS

JP 2004-095680 A 3/2004
JP 2017-175037 A 9/2017
KR 10-1376839 B1 3/2014

*Primary Examiner* — Michael P McFadden
(74) *Attorney, Agent, or Firm* — Morgan, Lewis & Bockius LLP

(57) ABSTRACT

A multilayer ceramic electronic component includes a ceramic body including a laminate body including first and second surfaces opposing each other in a first direction, third and fourth surfaces opposing each other in a second direction, and fifth and sixth surfaces opposing each other in a third direction, and including a dielectric layer, and a first internal electrode and a second internal electrode stacked in the third direction with the dielectric layer interposed therebetween, a first and a second margin portion; a first connection portion and a second connection portion. The first connection portion includes a first lead electrode connected to the first internal electrode, and the second connection portion includes a second lead electrode connected to the second internal electrode.

30 Claims, 38 Drawing Sheets

(51) Int. Cl.
 *H01G 4/12* (2006.01)
 *H01G 4/012* (2006.01)
 *H01G 2/06* (2006.01)
 *C04B 35/468* (2006.01)
 *H01G 4/008* (2006.01)

(52) U.S. Cl.
 CPC ........... *H01G 4/012* (2013.01); *H01G 4/1218* (2013.01); *H01G 4/232* (2013.01); *C04B 2235/66* (2013.01)

(58) Field of Classification Search
 CPC .... H01G 4/232; H01G 4/0085; H01G 4/1227; H01G 4/2325; H01G 4/008; H01G 4/33; H01G 2/065; C04B 35/468; C04B 2235/66
 See application file for complete search history.

(56) References Cited

U.S. PATENT DOCUMENTS

| | | | | |
|---|---|---|---|---|
| 2014/0345926 | A1* | 11/2014 | Lee | H01G 4/30 361/301.4 |
| 2015/0022945 | A1* | 1/2015 | Park | H01G 4/2325 156/89.18 |
| 2015/0084487 | A1* | 3/2015 | Mori | H01G 4/248 336/200 |
| 2017/0278634 | A1 | 9/2017 | Kato | |
| 2018/0019064 | A1* | 1/2018 | Han | H01G 2/06 |
| 2018/0190433 | A1* | 7/2018 | Cho | H01G 4/232 |
| 2019/0385795 | A1* | 12/2019 | Yang | H01G 4/30 |
| 2020/0194182 | A1* | 6/2020 | An | H01G 4/2325 |

* cited by examiner

A

II-II'

D

D

D

MULTILAYER CERAMIC ELECTRONIC COMPONENT AND METHOD OF MANUFACTURING THE SAME

CROSS-REFERENCE TO RELATED APPLICATION(S)

This application claims benefit of priority to Korean Patent Application No. 10-2020-0122208 filed on Sep. 22, 2020 in the Korean Intellectual Property Office, the disclosure of which is incorporated herein by reference in its entirety.

TECHNICAL FIELD

The present disclosure relates to a multilayer ceramic electronic component.

BACKGROUND

Electronic components using a ceramic material, such as a capacitor, an inductor, a piezoelectric element, a varistor, a thermistor, and the like, include a ceramic body formed of the ceramic material, internal electrodes formed in the ceramic body, and external electrodes installed on surfaces of the ceramic body to be connected to the internal electrodes.

As a method of forming the external electrodes, there is a method of applying a paste for an external electrode containing a conductive metal to a ceramic body that has been subjected to a sintering process, and sintering the ceramic body. Alternatively, there is a method of preparing a paste for an external electrode containing a conductive metal and a base resin, applying the paste to both end surfaces of a ceramic body that has been sintered, and curing the ceramic body.

However, when the external electrode is formed by such a method, a process of sintering or curing the already sintered ceramic body is required to form the external electrode. As a result, there may be a problem that productivity is lowered due to the complexity of the process steps.

In addition, in accordance with the recent trend for the miniaturization of electronic products, multilayer ceramic electronic components have also been required to be miniaturized and to have high capacitance. However, in the case of thinning the external electrodes of the multilayer ceramic electronic component for miniaturization and high capacitance of the multilayer ceramic electronic component, there is a problem that external moisture or the like can easily penetrate thereinto.

In particular, when a plating layer is formed on the external electrode for board mounting, and the like, defects in an internal structure of an electrode terminal and a body may be induced due to penetration of a plating solution during a plating process. This has a problem in that a decrease in reliability of a final product, particularly, characteristics deterioration and failure during high-temperature/high-pressure operation may occur.

SUMMARY

An aspect of the present disclosure may provide a multilayer ceramic electronic component having excellent moisture resistance reliability.

Another aspect of the present disclosure may provide a multilayer ceramic electronic component that may simplify a production process.

Another aspect of the present disclosure may provide a multilayer ceramic electronic component that may be miniaturized.

According to an aspect of the present disclosure, a multilayer ceramic electronic component may include a ceramic body including a laminate body including first and second surfaces opposing each other in a first direction, third and fourth surfaces opposing each other in a second direction, and fifth and sixth surfaces opposing each other in a third direction, and including a dielectric layer, and a first internal electrode and a second internal electrode stacked in the third direction with the dielectric layer interposed therebetween, a first margin portion disposed on the third surface of the laminate body, and a second margin portion disposed on the fourth surface of the laminate body; a first connection portion disposed on the first surface of the laminate body; and a second connection portion disposed on the second surface of the laminate body. The first connection portion may include a first lead electrode connected to the first internal electrode and a first ceramic layer disposed on the first lead electrode, and the second connection portion may include a second lead electrode connected to the second internal electrode and a second ceramic layer disposed on the second lead electrode. The first lead electrode may be led out to one surface of the first connection portion in the third direction, and the second lead electrode may be led out to one surface of the second connection portion in the third direction.

According to another aspect of the present disclosure, a multilayer ceramic electronic component may include a ceramic body including a laminate body including first and second surfaces opposing each other in a first direction, third and fourth surfaces opposing each other in a second direction, and fifth and sixth surfaces opposing each other in a third direction, and including a dielectric layer, and a first internal electrode and a second internal electrode stacked in the second direction with the dielectric layer interposed therebetween, a first margin portion disposed on the third surface of the laminate body, and a second margin portion disposed on the fourth surface of the laminate body; a first connection portion disposed on the first surface of the laminate body; and a second connection portion disposed on the second surface of the laminate body. The first connection portion may include a first lead electrode connected to the first internal electrode and a first ceramic layer disposed on the first lead electrode, and the second connection portion may include a second lead electrode connected to the second internal electrode and a second ceramic layer disposed on the second lead electrode. The first lead electrode may be led out to one surface of the first connection portion in the third direction, and the second lead electrode may be led out to one surface of the second connection portion in the third direction.

According to another aspect of the present disclosure, a multilayer ceramic electronic component may include a ceramic body including a laminate body having a first internal electrode and a second internal electrode stacked with a dielectric layer interposed therebetween; a first connection portion including a first lead electrode connected to the first internal electrode, and a first ceramic layer covering the first lead electrode and being in contact with the ceramic body; and a second connection portion including a second lead electrode connected to the second internal electrode, and a second ceramic layer covering the second lead electrode and being in contact with the ceramic body. the first lead electrode may include one end led out to one surface of the first connection portion, and the second lead electrode may include one end led out to one surface of the second connection portion.

According to another aspect of the present disclosure, a method of manufacturing a multilayer ceramic electronic component may include: forming a body including a laminate body having a first internal conductive paste layer and a second internal conductive paste layer with an internal ceramic paste layer interposed therebetween; forming a first conductive paste layer on one surface of the body, and a first ceramic paste layer covering the first conductive paste layer and being in contact with the body; forming a second conductive paste layer on another surface of the body, and a second ceramic paste layer covering the second conductive paste layer and being in contact with the body; and simultaneously sintering the body, the first conductive paste layer, the first ceramic paste layer, the second conductive paste layer, and the second ceramic paste layer. A first lead electrode, formed of the first conductive paste layer by the sintering, may be connected to a first internal electrode, formed of the first conductive paste layer by the sintering. A second lead electrode, formed of the second conductive paste layer by the sintering, may be connected to a second internal electrode, formed of the second conductive paste layer by the sintering. The first lead electrode may include an end exposed from a first ceramic layer, formed of the first conductive paste layer by the sintering. The second lead electrode may include an end exposed from a second ceramic layer, formed of the second conductive paste layer by the sintering.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
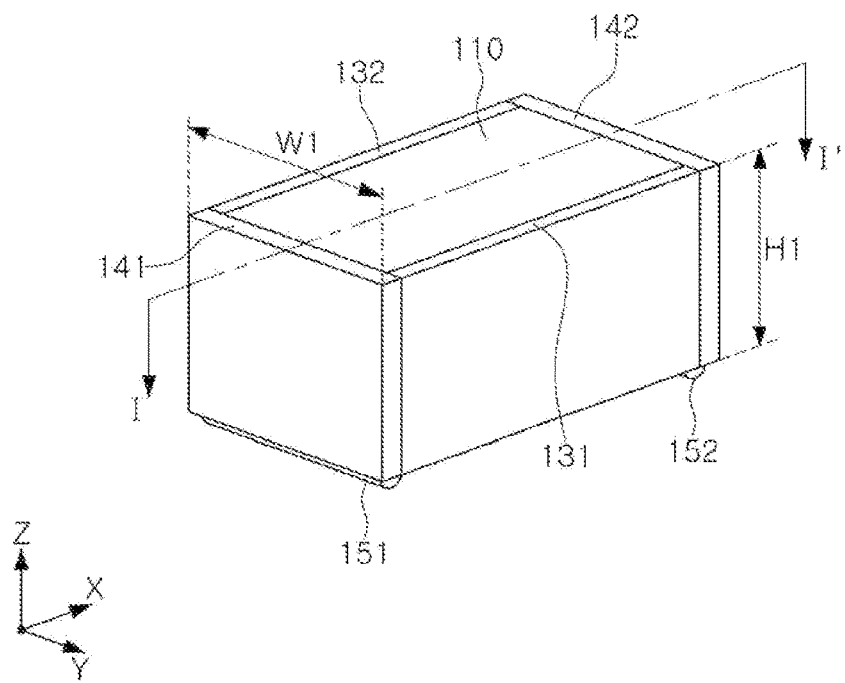
FIG. 1 is a schematic perspective view illustrating a multilayer ceramic electronic component according to an exemplary embodiment in the present disclosure.

Hereinafter, exemplary embodiments in the present disclosure will be described in detail with reference to the accompanying drawings. It is to be understood that technologies mentioned in the present specification are not limited to specific exemplary embodiments, but include various modifications, equivalents, and/or alternatives according to exemplary embodiments in the present disclosure. Throughout the drawings, similar components will be denoted by similar reference numerals.

In addition, in the drawings, portions unrelated to the description will be omitted in order to clearly describe the present disclosure, thicknesses of several layers and regions are exaggerated for clarity, and components having the same functions within the scope of the same idea will be denoted by the same reference numerals.

In the present specification, an expression "have", "may have", "include", "may include", or the like, indicates existence of a corresponding feature (for example, a numerical value, a function, an operation, a component such as a part, or the like), and does not exclude existence of an additional feature.

In the present specification, an expression "A and/or B", "at least one of A and B", "one or more of A and B", or the like, may include all possible combinations of items enumerated together. For example, "A and/or B", "at least one of A and B", or "one or more of A and B" may indicate all of (1) a case in which at least one A is included, (2) a case in which at least one B is included, or (3) a case in which both of at least one A and at least one B are included.

In the drawings, an X direction refers to a first direction, an L direction, or a length direction, a Y direction refers to a second direction, a W direction, or a width direction, and a Z direction refers to a third direction, a T direction, or a thickness direction.

The present disclosure relates to a multilayer ceramic electronic component 100. FIGS. 1 through 9 are schematic views illustrating a multilayer ceramic electronic component 100 according to an exemplary embodiment in the present disclosure. Referring to FIGS. 1 through 9, a multilayer ceramic electronic component 100 according to the present disclosure may include a ceramic body 110 including a laminate body 120 including first and second surfaces S1 and S2 opposing each other in a first direction (X direction), third and fourth surfaces S3 and S4 opposing each other in a second direction (Y direction), and fifth and sixth surfaces S5 and S6 opposing each other in a third direction (Z direction), and including a dielectric layer 111 and a first internal electrode 121 and a second internal electrode 122 stacked in the third direction (Z direction) with the dielectric layer 111 interposed therebetween, a first margin portion 131 disposed on the third surface S3 of the laminate body 120, and a second margin portion 132 disposed on the fourth surface S4 of the laminate body 120; a first connection portion 141 disposed on the first surface S1 of the laminate body 120; and a second connection portion 142 disposed on the second surface S2 of the laminate body 120.

At this time, the first connection portion 141 may include a first lead electrode 141a connected to the first internal electrode 121 and a first ceramic layer 141b disposed on the first lead electrode 141a, and the second connection portion 142 may include a second lead electrode 142a connected to the second internal electrode 122 and a second ceramic layer 142b disposed on the second lead electrode 142a. In addition, the first lead electrode 141a and the second lead electrode 142a may be led out to any one surface of the first connection portion 141 and the second connection portion 142 in the third direction (Z direction). A surface to which the first lead electrode 141a and the second lead electrode 142a are led may be in a direction of the fifth surface S5 or a direction of the sixth surface S6 of the laminate body 120.

That is, the multilayer ceramic electronic component 100 according to the present exemplary embodiment may have a structure in which an electrode is led out to only any one of the six outer surfaces in the third direction (Z direction). In addition, when viewing the multilayer ceramic electronic component 100 according to the present exemplary embodiment, the multilayer ceramic electronic component 100 may have a structure in which electrodes are led out to five surfaces are not visible, but only ceramic is observed, and an electrode externally led out to only one surface in the third direction (Z direction) is visible.

Figure 2:
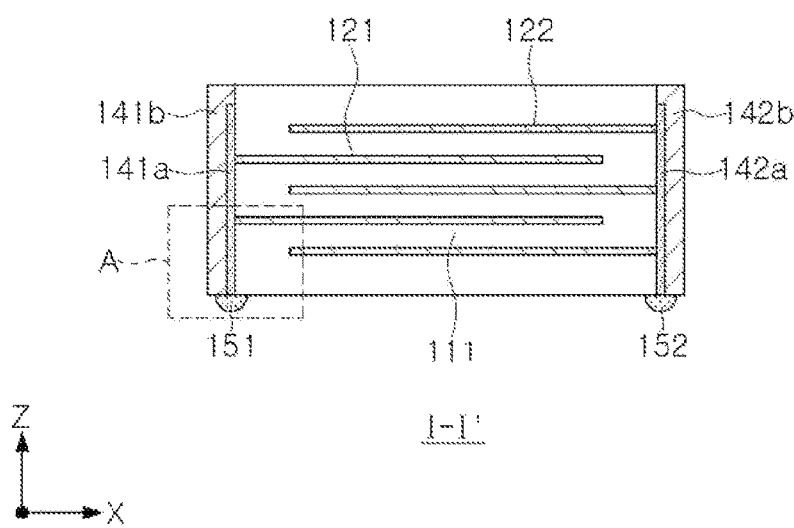
FIG. 2 is a cross-sectional view taken along line I-I' of FIG. 1.
Figure 3:
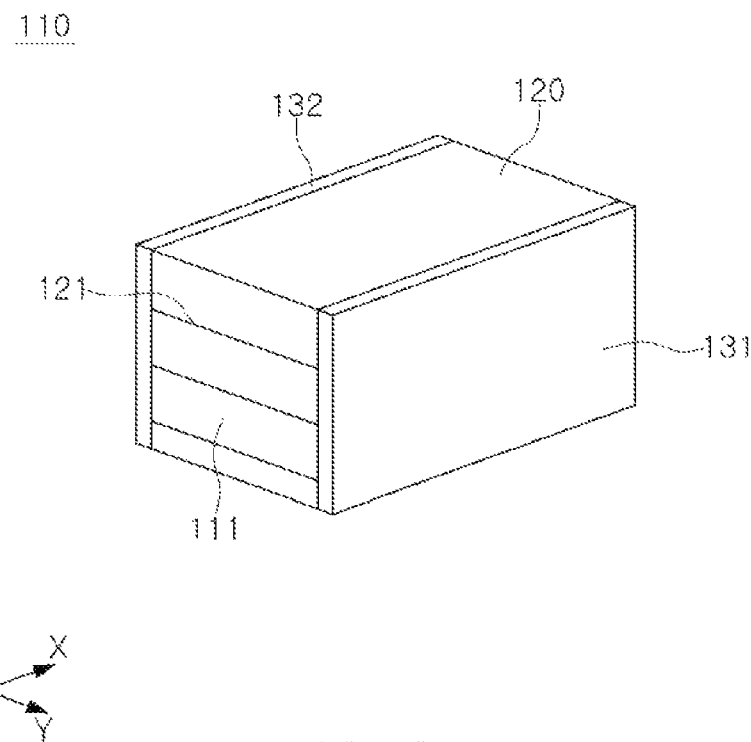
FIG. 3 is a schematic perspective view illustrating a ceramic body of FIG. 1.
Figure 4:
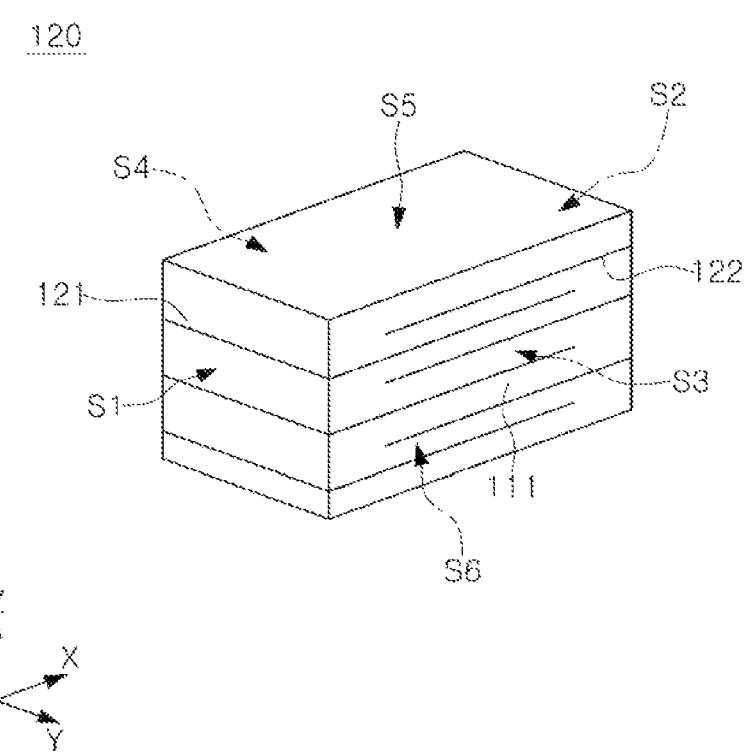
FIG. 4 is a schematic perspective view illustrating a laminate body of FIG. 3.
Figure 5:
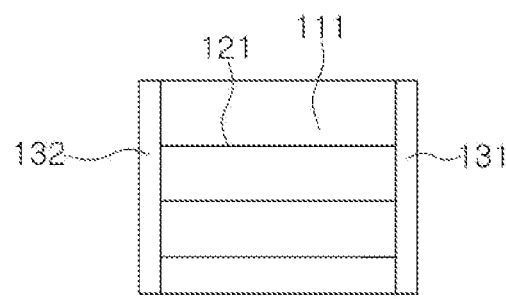
FIG. 5 is a front view of FIG. 3 when viewed in an X direction.

Referring to FIG. 2, the first lead electrode 141a and the second lead electrode 142a may be led through one surface (sixth surface S6) of the laminate body 120 in the third direction (Z direction), and may be disposed to be spaced apart from each other with the ceramic body 110 interposed therebetween. Conventional multilayer ceramic electronic components used a structure in which external electrodes connected to internal electrodes are disposed to cover a head surface of the ceramic body. In this case, there was a problem such as an occurrence of a gap between the ceramic body and the external electrode, or penetration of moisture between the ceramic body and the external electrode. According to the exemplary embodiment in the present disclosure, by significantly reducing the electrodes exposed to the outside, the penetration of moisture from the outside may be effectively prevented, and thus excellent moisture resistance reliability may be implemented.

In addition, in the case of the related art, internal stress may remain due to a difference in shrinkage behavior between the external electrode and the ceramic body. As a result, there may be a problem that mechanical strength of the electronic component itself is lowered. In the multilayer ceramic electronic component according to the present disclosure, the mechanical strength of the component itself may be improved by simultaneously sintering the ceramic body and the electrode through one sintering process as described later while not forming a separate external electrode. Further, since the separate external electrode is not disposed, the component itself may be miniaturized.

The first connection portion 141 of the multilayer ceramic electronic component 100 according to the present disclosure may include a first lead electrode 141a and a first ceramic layer 141b. In addition, the second connection portion 142 may include a second lead electrode 142a and a second ceramic layer 142b.

In an example in the present disclosure, the first ceramic layer 141b of the multilayer ceramic electronic component 100 may be disposed to cover at least a portion of the first lead electrode 141a, and the second ceramic layer 142b may be disposed to cover at least a portion of the second lead electrode 142a. The ceramic layers being disposed to cover at least portions of the lead electrodes may mean a state in which the ceramic layers are disposed on at least portions of opposite surfaces of the first lead electrode 141a and the second lead electrode 142*a* in the first direction (X direction) disposed on the laminate body 120 of the multilayer ceramic electronic component 100 according to the present disclosure, and may mean a state in which at least portions of the first and second lead electrodes 141*a* and 142*a* and the ceramic layers are disposed to be in contact with each other.

In another example, the first ceramic layer 141*b* of the multilayer ceramic electronic component 100 may be disposed to cover the first lead electrode 141*a*, and the second ceramic layer 142*b* may be disposed to cover the second lead electrode 142*a*. The ceramic layers being disposed to cover the lead electrodes may mean a state in which only the ceramic layers are visible, and the lead electrodes are hidden by the ceramic layers and are not visible, when the multilayer ceramic electronic component 100 according to the present disclosure is viewed from the first direction (X direction). That is, the first ceramic layer 141*b* may be disposed so as not to expose the first lead electrode 141*a* in the first direction, and the second ceramic layer 142*b* may be disposed so as not to expose the second lead electrode 142*a* in the first direction (X direction). In this manner, when the first ceramic layer 141*b* is disposed to cover the first lead electrode 141*a*, and the second ceramic layer 142*b* is disposed to cover the second lead electrode 142*a*, an area where the lead electrodes are exposed to the outside may be reduced, thereby significantly reducing an external moisture penetration path.

In addition, the first ceramic layer 141*b* of the multilayer ceramic electronic component 100 according to an exemplary embodiment in the present disclosure may be disposed to cover the first surface S1 of the laminate body 120, and the second ceramic layer 142*b* may be disposed to cover the second surface S2 of the laminate body 120. Therefore, the first lead electrode 141*a* may be disposed to be in contact with the first surface S1 of the laminate body 120, and the first ceramic layer 141*b* may be disposed to cover the first lead electrode 141*a*. In addition, the second lead electrode 142*a* may be disposed to be in contact with the second surface S2 of the laminate body 120, and the second ceramic layer 142*b* may be disposed to cover the second lead electrode 142*a*. That is, the first lead electrode 141*a* may be disposed on the first surface S1 of the laminate body 120 and may be disposed to be connected to the first internal electrode 121, and the second lead electrode 142*a* may be disposed on the second surface S2 of the laminate body 120 and may be disposed to be connected to the second internal electrode 122.

Figure 6:
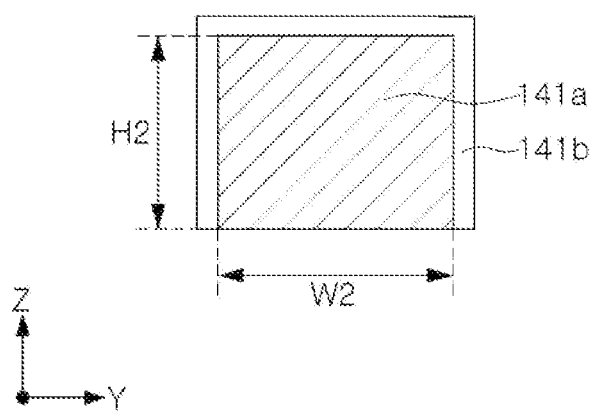
FIG. 6 is a view illustrating an interior of a first connection portion of FIG. 1.

In an exemplary embodiment in the present disclosure, a maximum value of a width of the first lead electrode 141*a* and/or the second lead electrode 142*a* of the multilayer ceramic electronic component 100 in the second direction (Y direction) may be smaller than a maximum value of a width of the ceramic body 110 in the second direction (Y direction). FIG. 6 is a schematic cross-sectional view illustrating the first connection portion 141 according to an exemplary embodiment in the present disclosure. In the present specification, the description of the first connection portion 141 of FIG. 6 may also be equally applied to the second connection portion 142. Referring to FIGS. 1 and 6, a maximum value W2 of a width of the first lead electrode 141*a* of the first connection portion 141 and/or the second lead electrode 142*a* of the second connection portion 142 in the second direction (Y direction) may be smaller than a maximum value W1 of a width of the ceramic body 110 in the second direction (Y direction). That is, a relationship of W 2<W 1 may be satisfied. When the maximum value of the width of the first lead electrode 141*a* and/or the second lead electrode 142*a* in the second direction (Y direction) is smaller than the maximum value of the width of the ceramic body 110 in the second direction (Y direction), the first lead electrode 141*a* and/or the second lead electrode 142*a* may not be exposed in the second direction (Y direction) of the multilayer ceramic electronic component 100 according to the present disclosure, thereby further improving moisture resistance.

At this time, when the first ceramic layer 141*b* is disposed to cover the first lead electrode 141*a* and the second ceramic layer 142*b* is disposed to cover the second lead electrode 142*a* as described above, a width of the first ceramic layer 141*b* and/or the second ceramic layer 142*b* in the second direction (Y direction) may be equal to the maximum value W1 of the width of the ceramic body 110 in the second direction (Y direction). That is, the first ceramic layer 141*b* and the second ceramic layer 142*b* may be disposed on opposite surfaces of the ceramic body 110 in the first direction, and may be disposed to cover at least all of the width directions of the ceramic body 110.

In an example, a maximum value of a height of the first lead electrode 141*a* and/or the second lead electrode 142*a* according to the present disclosure in the third direction (Z direction) may be smaller than a maximum value of a height of the ceramic body 110 in the third direction (Z direction). Referring to FIGS. 1 and 6, a maximum value H2 of a height of the first lead electrode 141*a* of the first connection portion 141 and/or the second lead electrode 142*a* of the second connection portion 142 in the third direction (Z direction) may be smaller than a maximum value H1 of a height of the ceramic body 110 in the third direction (Z direction). That is, a relationship of H2 <H1 may be satisfied. When the maximum value of the height of the first lead electrode 141*a* and/or the second lead electrode 142*a* in the third direction (Z direction) is smaller than the maximum value of the height of the ceramic body 110 in the third direction (Z direction), the possibility of moisture penetration may be reduced by exposing the first lead electrode 141*a* and/or the second lead electrode 142*a* to only one surface of the multilayer ceramic electronic component 100 according to the present disclosure in the third direction (Z direction).

When the first ceramic layer 141*b* is disposed to cover the first lead electrode 141*a* and the second ceramic layer 142*b* is disposed to cover the second lead electrode 142*a* as described above, a height of the first ceramic layer 141*b* and/or the second ceramic layer 142*b* in the third direction (Z direction) may be equal to the maximum value H1 of the height of the ceramic body 110 in the third direction (Z direction). That is, the first ceramic layer 141*b* and the second ceramic layer 142*b* may be disposed on the opposite surfaces of the ceramic body 110 in the first direction, and may be disposed to cover at least all of the thickness directions of the ceramic body 110.

In addition, in an example in the present disclosure, when the first ceramic layer 141*b* is disposed to cover the first lead electrode 141*a* and the second ceramic layer 142*b* is disposed to cover the second lead electrode 142*a*, the first ceramic layer 141*b* and the second ceramic layer 142*b* may be disposed to cover the opposite surfaces of the ceramic body 110 in the first direction (X direction).

In an exemplary embodiment in the present disclosure, the ceramic body 110 of the multilayer ceramic electronic component 100 according to the present disclosure may include a laminate body 120, a first margin portion 131, and a second margin portion 132.

A shape of the ceramic body 110 is not particularly limited, but may be a hexahedral shape or a shape similar to the hexahedral shape, as illustrated. Although the ceramic body 110 does not have a hexahedral shape having perfectly straight lines due to shrinkage of ceramic powders included in the ceramic body 110 in a sintering process, the ceramic body 110 may have substantially the hexahedral shape. The ceramic body 110 may be subjected to rounding treatment so that edges thereof are not angled, if necessary. The rounding treatment may be, for example, barrel polishing or the like, but is not limited thereto.

The dielectric layers 111, the first internal electrode 121, and the second internal electrode 122 may be alternately stacked in the laminate body 120 of the multilayer ceramic electronic component 100 according to the present disclosure. The dielectric layer 111, the first internal electrode 121, and the second internal electrode 122 may be stacked in the third direction (Z direction). The plurality of dielectric layers 111 forming the laminate body 120 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as a sufficient capacitance may be obtained therewith. For example, a barium titanate-based material, a lead composite perovskite-based material, a strontium titanate-based material may be used, or a component represented by $(Ba_{1-x}Ca_x)(Ti_{1-y}(Zr, Sn, Hf)_y)O_3$ (here, $0 \le x \le 1$ and $0 \le y \le 0.5$) may be used. In addition, a material of the dielectric layer 111 may be prepared by adding various ceramic additives, organic solvents, plasticizers, binders, dispersants, and the like, to powders such as barium titanate ($BaTiO_3$) powders, or the like, according to an object of the present disclosure.

The dielectric layers 111 may be formed by adding an additive as necessary to slurry including the material described above and applying and then drying the slurry to carrier films to prepare a plurality of ceramic sheets. The ceramic sheets may be formed by manufacturing the slurry in a sheet shape having a thickness of several micrometers by a doctor blade method, but are not limited thereto.

The first and second internal electrodes 121 and 122 may be stacked so that end surfaces thereof are exposed, respectively, to opposite end portions of the ceramic body 110 opposing each other. Specifically, the first and second internal electrodes 121 and 122 may be exposed to the opposite surfaces of the ceramic body 110 in the first direction (X direction), respectively, the first internal electrodes 121 may be exposed to a first surface S1 of the ceramic body 110, and the second internal electrodes 122 may be exposed to a second surface S2 of the ceramic body 110.

A material of each of the first and second internal electrodes 121 and 122 is not particularly limited, but may be a conductive paste including one or more conductive metals of, for example, silver (Ag), palladium (Pd), gold (Au), platinum (Pt), nickel (Ni), copper (Cu), tin (Sn), tungsten (W), titanium (Ti), and alloys thereof.

The laminate body 120 may be formed by alternately stacking ceramic green sheets on which the first internal electrodes 121 are printed and ceramic green sheets on which the second internal electrodes 122 are printed, on the dielectric layers 111 in the third direction (Z direction). A method of printing the first and second internal electrodes may be a screen printing method, a gravure printing method or the like, but is not limited thereto.

The first margin portion 131 and the second margin portion 132 may include a ceramic material such as a barium titanate ($BaTiO_3$)-based ceramic material. The first margin portion 131 and the second margin portion 132 may be formed by applying a slurry including a ceramic material in the second direction (Y direction) of the laminate body 120, or may be formed by attaching a single dielectric layer or two or more dielectric layers in the second direction (Y direction), respectively. The first margin portion 131 and the second margin portion 132 may basically serve to prevent damage to the internal electrodes due to physical or chemical stress.

In the multilayer ceramic electronic component according to an exemplary embodiment in the present disclosure, the first connection portion 141 and the second connection portion 142 may be disposed on opposite surfaces of the ceramic body 110 in the first direction (X direction), respectively. The first connection portion 141 and the second connection portion 142 may have dimensions and areas corresponding to the opposite surfaces of the ceramic body 110 in the first direction (X direction). As described above, the first connection portion 141 may be disposed to cover the first surface of the laminate body 120, and the second connection portion 142 may be disposed to cover the second surface of the laminate body 120.

The first connection portion 141 may include a first lead electrode 141a, and the second connection portion 142 may include a second lead electrode 142a. The first lead electrode 141a may be connected to the first internal electrodes 121, and the second lead electrode 142a may be connected to the second internal electrodes 122. A material of each of the first and second lead electrodes 141a and 142a is not particularly limited, but may be a conductive paste including one or more conductive metals of, for example, silver (Ag), palladium (Pd), gold (Au), platinum (Pt), nickel (Ni), copper (Cu), tin (Sn), tungsten (W), titanium (Ti), and alloys thereof.

In this case, desired characteristics may be implemented by adjusting the conductive metal component included in the first and second lead electrodes 141a and 142a. For example, when the first and second lead electrodes 141a and 142a include the same metal component as the first and second internal electrodes 121 and 122, the connectivity between each lead electrode and each internal electrode may be improved. In addition, in order to adjust a shrinkage rate during sintering or to adjust internal stress after sintering, the first lead electrode 141a and the second lead electrode 142a may include components different from the first internal electrodes 121 and the second internal electrodes 122 as necessary.

The first connection portion 141 may include a first ceramic layer 141b, and the second connection portion 142 may include a second ceramic layer 142b. The first ceramic layer 141b and the second ceramic layer 142b may include a ceramic material such as a barium titanate ($BaTiO_3$)-based ceramic material. The barium titanate ($BaTiO_3$)-based ceramic material may be a component represented by, for example, $(Ba_{1-x}Ca_x)(Ti_{1-y}(Zr, Sn, Hf)_y)O_3$ (here, $0 \le x \le 1$ and $0 \le y \le 0.5$).

In this case, the first ceramic layer 141b and/or the second ceramic layer 142b may include a ceramic component of the same or different component as the dielectric layer 111 of the laminate body 120 in order to implement desired characteristics. For example, when the first ceramic layer 141b and the second ceramic layer 142b include the same ceramic component as the dielectric layer of the laminate body 120, a similar sintering behavior may be exhibited, thereby reducing internal stress of a finished component.

In addition, in another example in the present disclosure, the first ceramic layer 141b and/or the second ceramic layer 142b of the first connection portion 141 and/or the second connection portion 142 of the multilayer ceramic electronic component 100 according to the present disclosure may include a ceramic component having a composition different from that of the dielectric layer 111 of the laminate body 120. The first and second lead electrodes 141a and 142a of the first and second connection portions 141 and 142 may be respectively connected to the first internal electrodes 121 and the second internal electrodes 122. On the other hand, the first ceramic layer 141b and the second ceramic layer 142b of the first and second connecting portions 141 and 142 are portions that do not contribute to the formation of capacitance, and are enough to perform a function for blocking physical or chemical stress from the outside. Therefore, by adjusting the components of the first ceramic layer 141b and/or the second ceramic layer 142b, a density and an average grain size of the grains may be adjusted, thereby more effectively preventing moisture penetration. When the first ceramic layer 141b and/or the second ceramic layer 142b include a ceramic component having a composition different from that of the dielectric layer 111 of the laminate body 120, whether or not components such as Na, Li, B, and/or Mg are included and the contents thereof may be adjusted, but this is only an example and is not limited thereto.

The method of manufacturing a multilayer ceramic electronic component according to the present disclosure is not particularly limited, but the multilayer ceramic electronic component may be manufactured by, for example, forming the first margin portion 131 on the third surface S3 of the laminate body 120, forming the second margin portion 142 on the fourth surface S4, and then forming the first connection portion 141 and the second connection portion 142. The first connection portion 141 and the second connection portion 142 may be manufactured by applying and drying a conductive paste to form the first lead electrode 141a and the second lead electrode 142a on opposite surfaces of the ceramic body 110 in the first direction (X direction), applying and drying a ceramic paste for forming the first ceramic layer 141b and the second ceramic layer 142b on the dried conductive paste, and then sintering the ceramic paste, or may be manufactured by transferring ceramic sheets for forming the first ceramic layer 141b and the second ceramic layer 142b on the dried conductive paste and then sintering the ceramic sheets. Alternatively, the first connection portion 141 and the second connection portion 142 may be manufactured by printing the lead electrodes on the ceramic sheets and then attaching the lead electrodes on the opposite surfaces of the ceramic body 110 in the first direction (X direction) and sintering the lead electrodes. As described above, the multilayer ceramic electronic component 100 according to the present disclosure may be manufactured through a single sintering process after forming the first connection portion 141 and the second connection portion 142 on the ceramic body 110, and since a sintering process for forming separate external electrodes is not required, the process may be simplified.

Figure 7A:
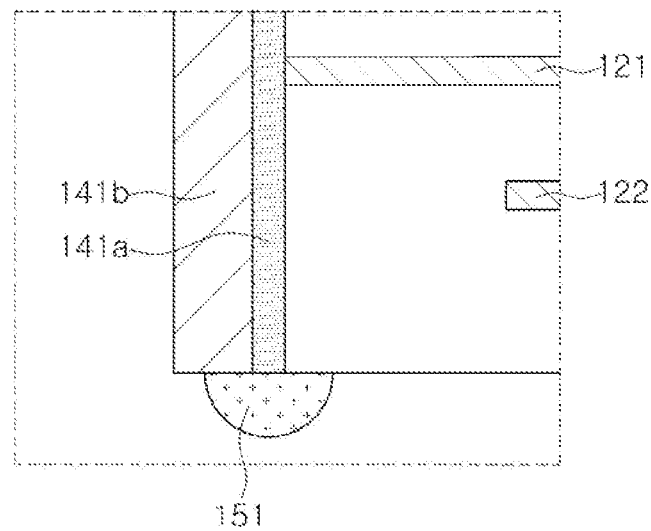
FIG. 7A is an enlarged view of region A of FIG. 2.
Figure 7B:
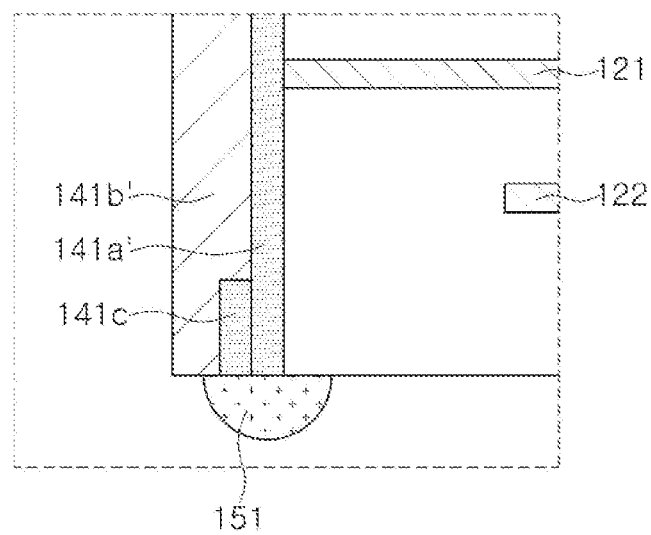
FIGS. 7B, 8A, 8B, and 9 are views illustrating modified forms of FIG. 7A.

According to a modified form of the present disclosure, the first connection portion 141 of the multilayer ceramic electronic component 100 of the present disclosure may include a first auxiliary electrode 141c disposed to be in contact with a first lead electrode 141a', and the second connection portion 142 may include a second auxiliary electrode disposed to be in contact with a second lead electrode. In this case, the first auxiliary electrode 141c may be led out together with the first lead electrode 141a', and the second auxiliary electrode may be led out together with the second lead electrode. FIG. 7B is an enlarged view illustrating the first connection portion 141 of the present modified form. The contents illustrated in FIG. 7B may be equally applied to the second connection portion 142. Referring to FIG. 7B, the first auxiliary electrode 141c may be disposed to be in contact with the first lead electrode 141a', and a first ceramic layer 141b' may be disposed to cover the first lead electrode 141a' and the first auxiliary electrode 141c. When the auxiliary electrodes are disposed as illustrated in FIG. 7B, electrical characteristics may be improved by increasing a contact area with an external plating layer, which will be described later, by a size of the auxiliary electrodes.

A method of forming the auxiliary electrodes is not particularly limited, but the auxiliary electrodes may be formed by forming steps on lower sides of the first ceramic layer 141b and the second ceramic layer 142b, and applying a lead electrode paste to the steps. In addition, an example of the method of forming the auxiliary electrodes may include a method of forming auxiliary electrodes by printing the first ceramic layer 141b and the second ceramic layer 142b in a two-layer structure, applying and drying a conductive paste on one of the ceramic layers, and attaching the ceramic layers to the laminate body, but is not limited thereto.

Figure 8A:
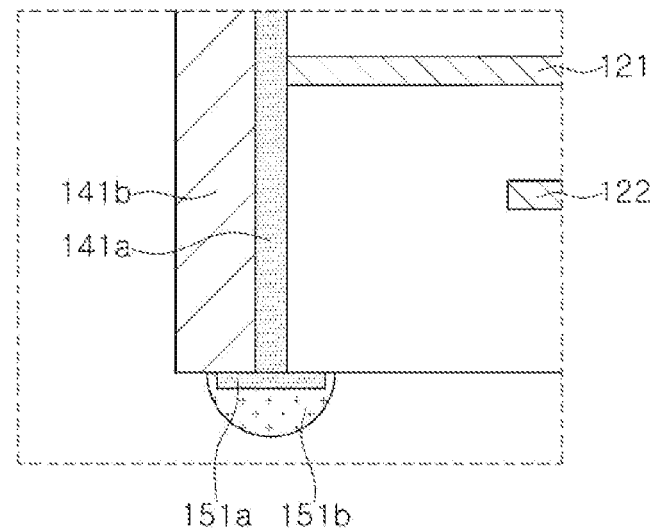

According to another modified form of the present disclosure, the multilayer ceramic electronic component 100 of the present disclosure may include a first terminal electrode 151a connected to the first lead electrode 141a, and a second terminal electrode 152a connected to the second lead electrode 142a. In this case, the first terminal electrode 151a and the second terminal electrode may be disposed to be spaced apart from each other on a surface from which the first lead electrode 141a and the second lead electrode 142a are led. FIG. 8A is an enlarged view illustrating the first connection portion 141 of the present modified form. The contents illustrated in FIG. 8A may be equally applied to the second connection portion 142. Referring to FIG. 8A, the first terminal electrode 151a connected to the first lead electrode 141a may be disposed, and an external plating layer, which will be described later, may be disposed on the first terminal electrode 151a. When the terminal electrode is disposed as illustrated in FIG. 8A, an external plating layer or the like may be formed in a large size, and thus, excellent adhesion may be obtained when mounting a substrate.

The terminal electrodes may be formed, for example, by applying a terminal electrode paste on lead portions of the first lead electrode 141a and the second lead electrode 142a, or may be formed by applying a terminal electrode paste or powder on the first lead electrode 141a and the second lead electrode 142a of the ceramic body 110 on which sintering has been completed, and sintering the terminal electrode paste or powder by a method such as induction heating, but are not limited thereto.

Figure 8B:
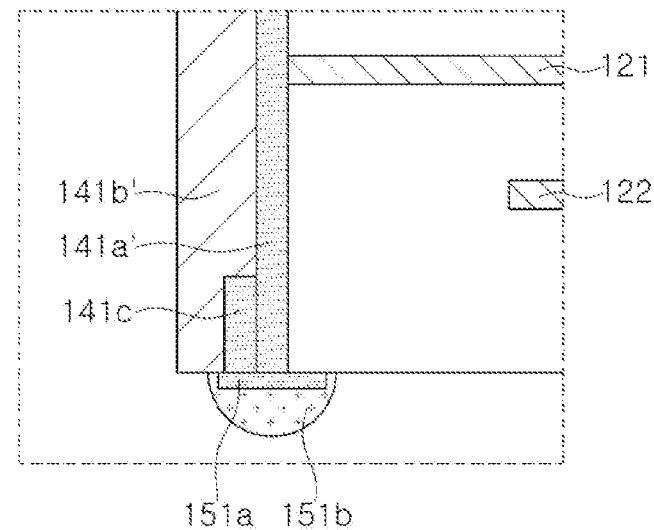

According to another modified form of the present disclosure, the first connection portion 141 of the multilayer ceramic electronic component 100 of the present disclosure may include a first auxiliary electrode 141c disposed to be in contact with a first lead electrode 141a', and the second connection portion 142 may include a second auxiliary electrode disposed to be in contact with a second lead electrode. The multilayer ceramic electronic component 100 of the present disclosure may include a first terminal electrode 151a connected to the first lead electrode 141a', and a second terminal electrode connected to the second lead electrode. In this case, the first terminal electrode 151a and the second terminal electrode may be disposed to be spaced apart from each other on a surface from which the first lead electrode 141a' and the second lead electrode are led. FIG. 8B is an enlarged view illustrating the first connection portion 141 of the present modified form. The contents illustrated in FIG. 8B may be equally applied to the second connection portion 142. Referring to FIG. 8B, the first connection portion 141 may include the first auxiliary electrode 141c disposed to be in contact with the first lead electrode 141a', and the first lead electrode 141a' and the first auxiliary electrode 141c may be lead out to the same surface of the multilayer ceramic electronic component 100. In addition, the first terminal electrode 151a may be disposed to cover the first lead electrode 141a' and the first auxiliary electrode 141c. When the auxiliary electrode and the terminal electrode are disposed together as illustrated in FIG. 8B, electrical characteristics may be improved and board mountability may be improved.

In an example, the multilayer ceramic electronic component 100 according to the present disclosure may include a first plating layer 151 disposed on the first lead electrode 141a and a second plating layer 152 disposed on the second lead electrode 142a. FIGS. 1, 2, and 7A through 8B illustrate the multilayer ceramic electronic component 100 according to the present example. In the multilayer ceramic electronic component 100 according to the example above, the first connection portion 141 and the second connection portion 142 may have the same structure so as to be symmetrical to each other. Referring to FIGS. 1, 2, and 7A through 8B, the first plating layer 151 may be disposed on the first lead electrode 141a. In this case, when the first auxiliary electrode 141c or the first terminal electrode 151a is formed, the first plating layers 151 and 151b may be disposed to cover the first lead electrode 141a, the first auxiliary electrode and/or the first terminal electrode. The plating layer may include one or more selected from the group consisting of copper (Cu), nickel (Ni), tin (Sn), palladium (Pd), platinum (Pt), gold (Au), silver (Ag), tungsten (W), titanium (Ti), lead (Pb), and alloys thereof, but is not limited thereto. The plating layer may be formed as a single layer or a plurality of layers, and may be formed by sputtering or electroplating, but is not limited thereto.

Figure 9:
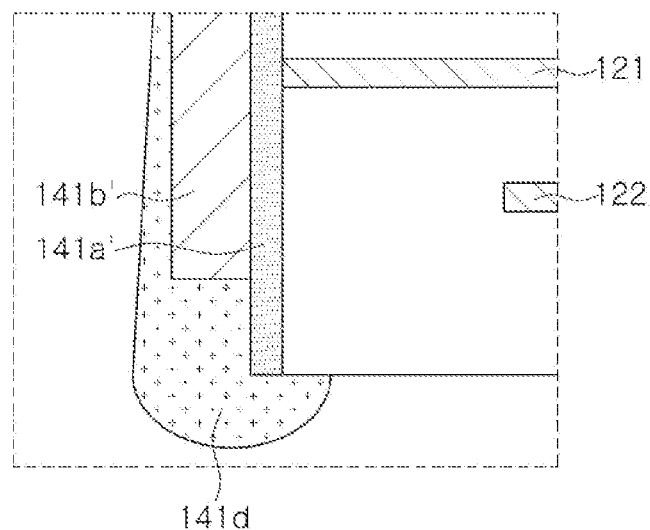
Figure 10:
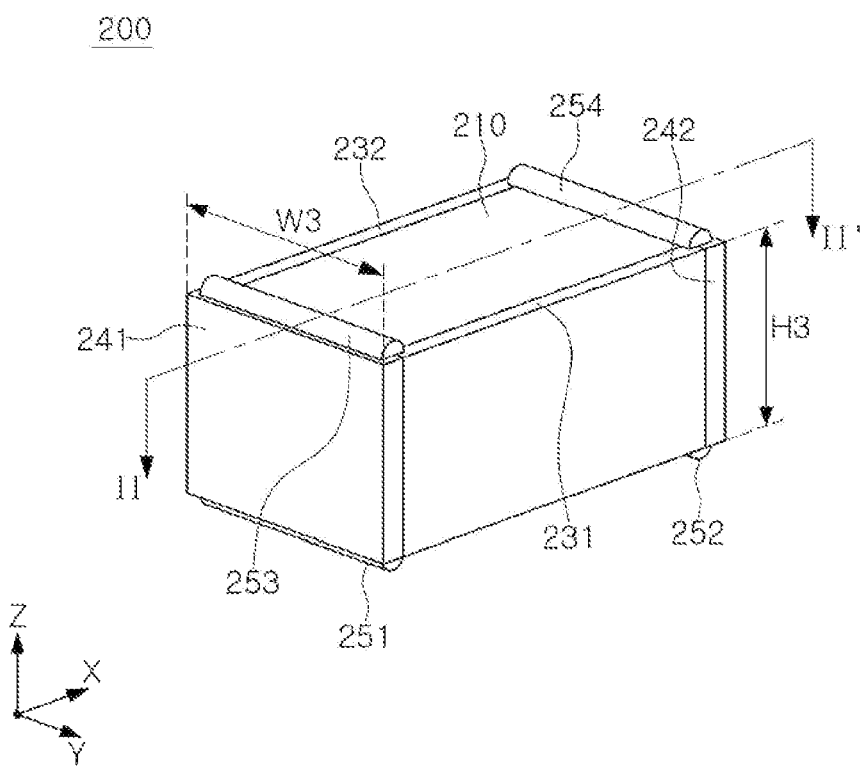
FIG. 10 is a schematic perspective view illustrating a multilayer ceramic electronic component according to another exemplary embodiment in the present disclosure.
Figure 11:
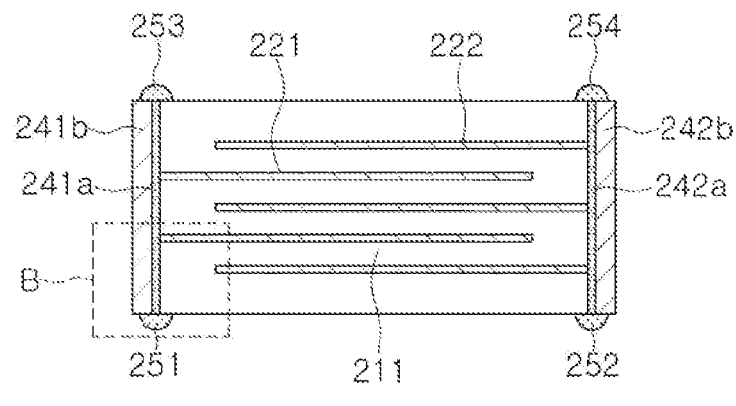
FIG. 11 is a cross-sectional view taken along line II-II' of FIG. 10.
Figure 12:
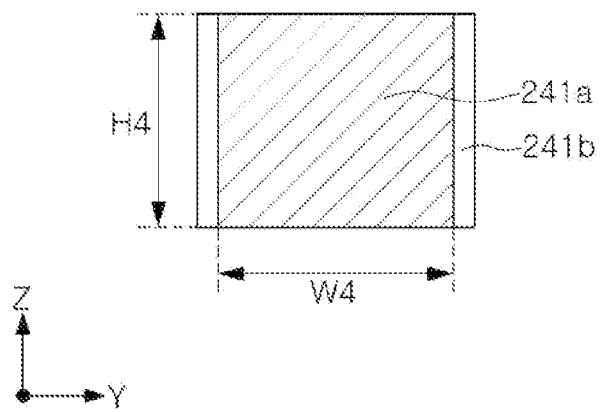
FIG. 12 is a view illustrating an interior of a first connection portion of FIG. 10.
Figure 13A:
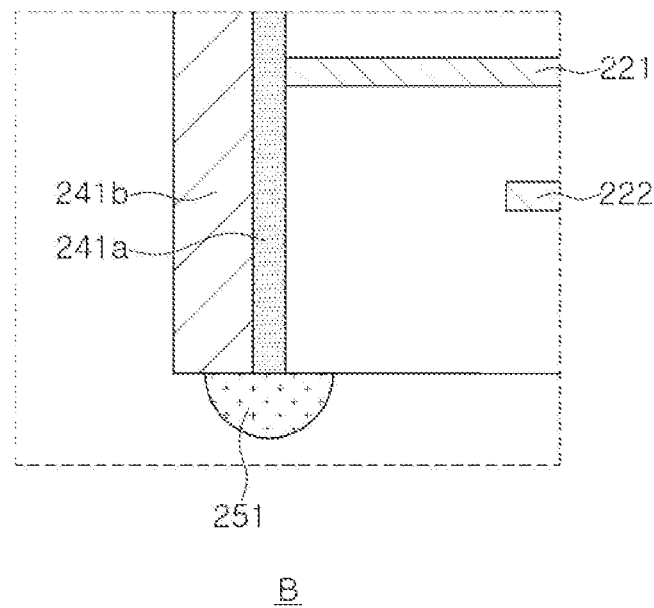
FIG. 13A is an enlarged view of region B of FIG. 11.
Figure 13B:
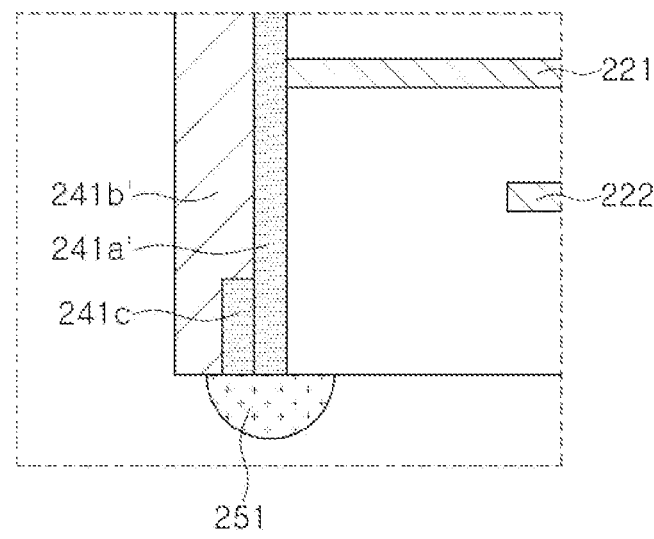
FIGS. 13B, 14A, 14B, and 15 are views illustrating modified forms of FIG. 13A.
Figure 14A:
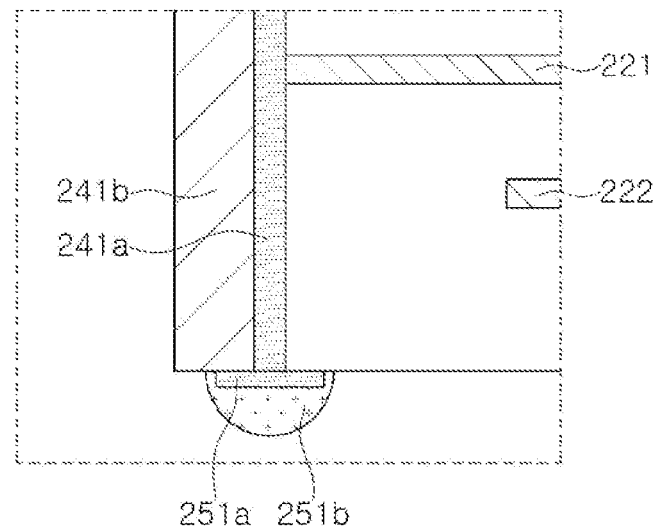
Figure 14B:
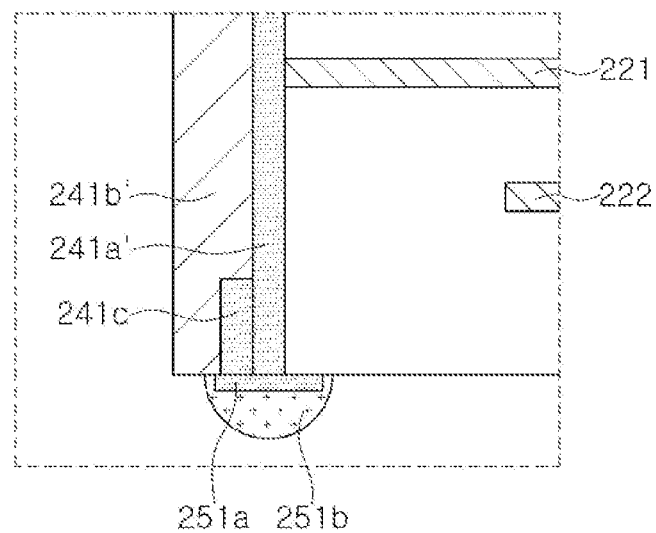
Figure 15:
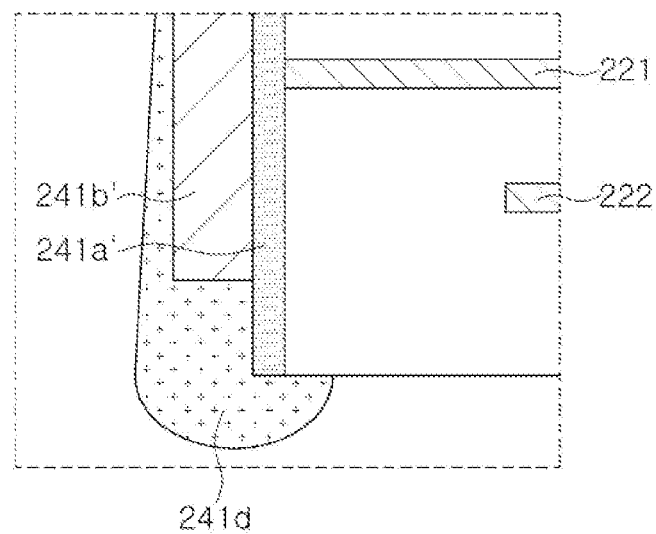
Figure 16:
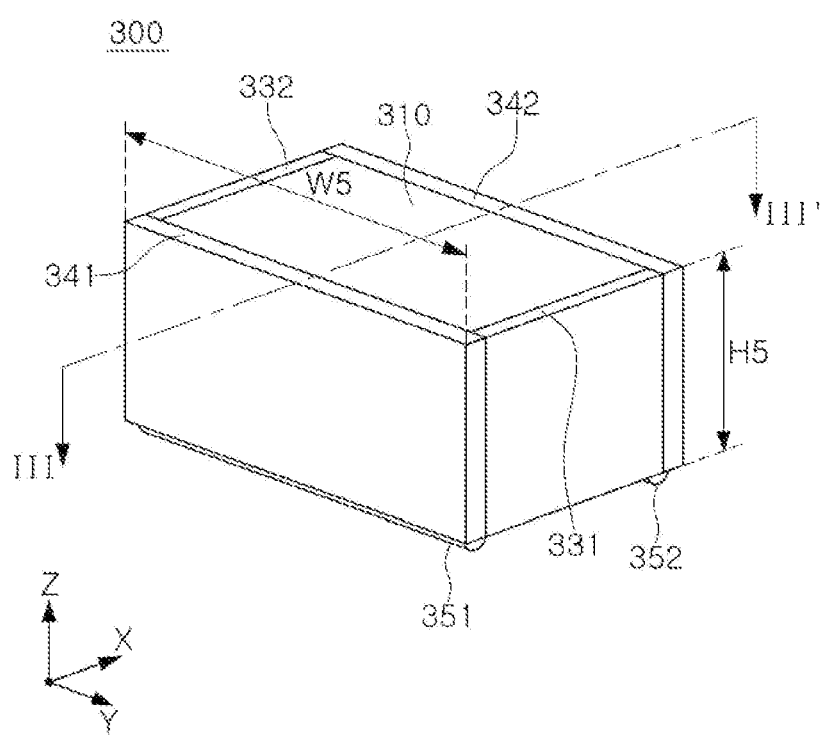
FIG. 16 is a schematic perspective view illustrating a multilayer ceramic electronic component according to another exemplary embodiment in the present disclosure.
Figure 17:
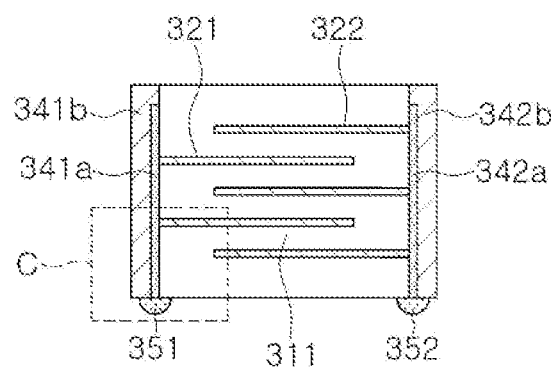
FIG. 17 is a cross-sectional view taken along line of FIG. 16.
Figure 18:
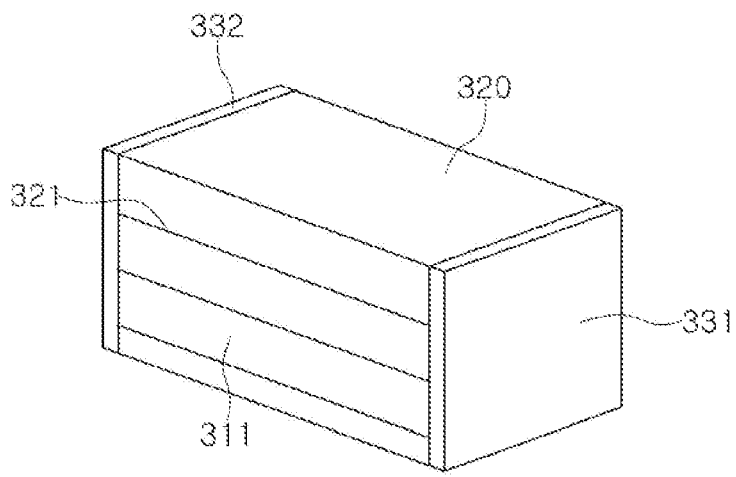
FIG. 18 is a schematic perspective view illustrating a ceramic body of FIG. 16.
Figure 19:
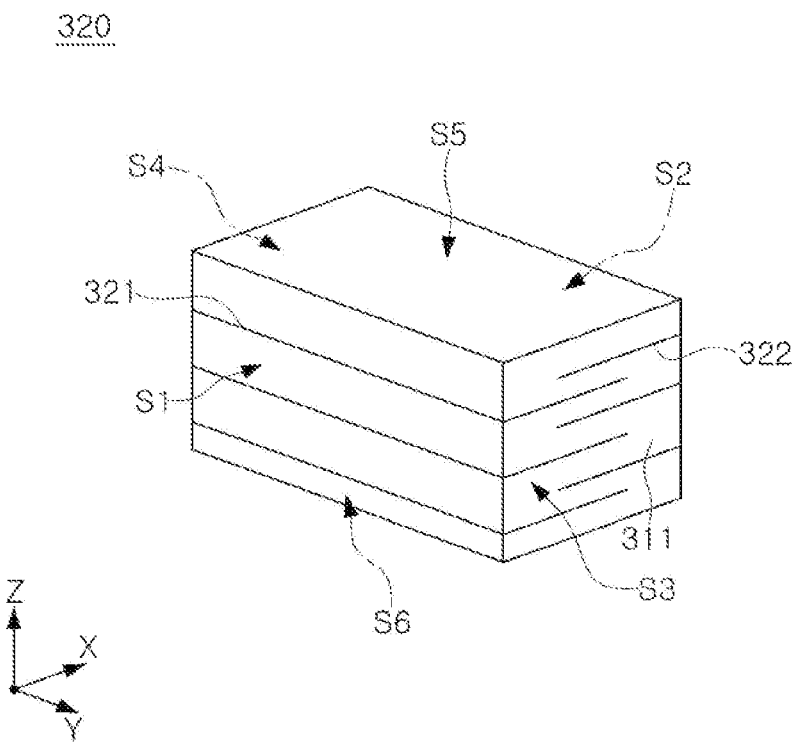
FIG. 19 is a schematic perspective view illustrating a laminate body of FIG. 18.
Figure 20:
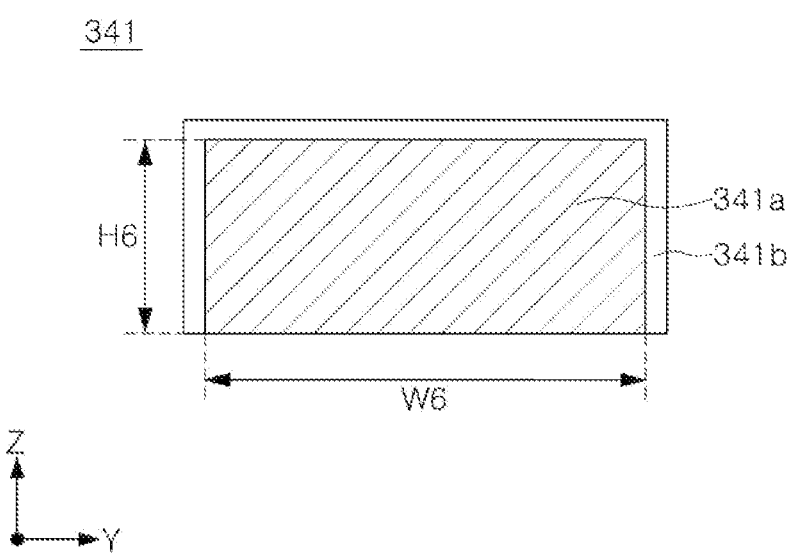
FIG. 20 is a view illustrating an interior of a first connection portion of FIG. 16.
Figure 21A:
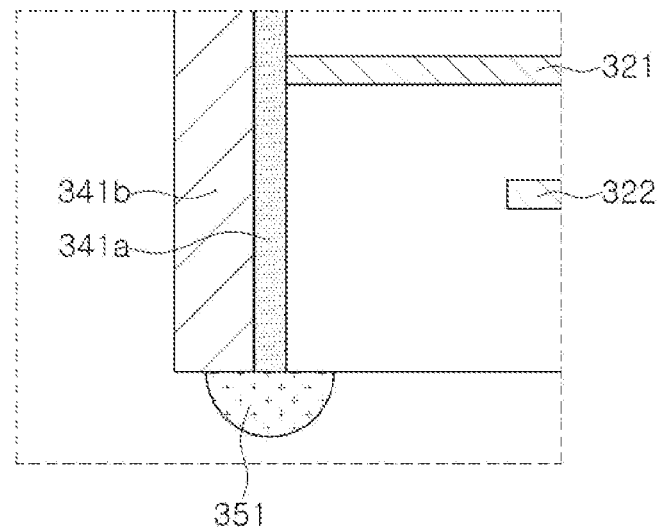
FIG. 21A is an enlarged view of region C of FIG. 17.
Figure 21B:
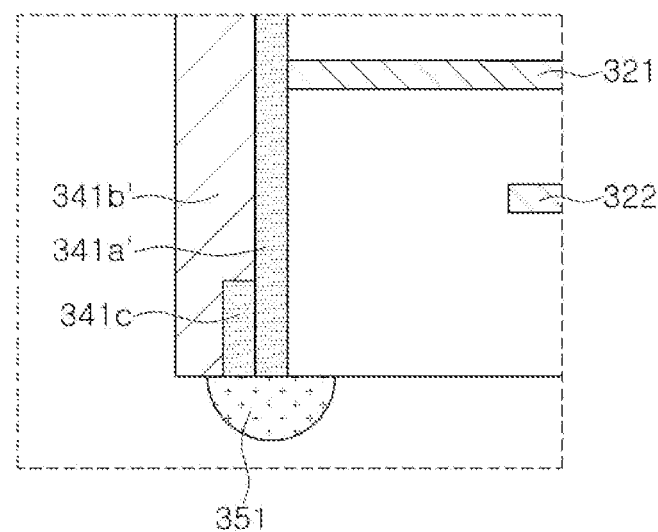
FIGS. 21B, 22A, 22B, and 23 are views illustrating modified forms of FIG. 21A.
Figure 22A:
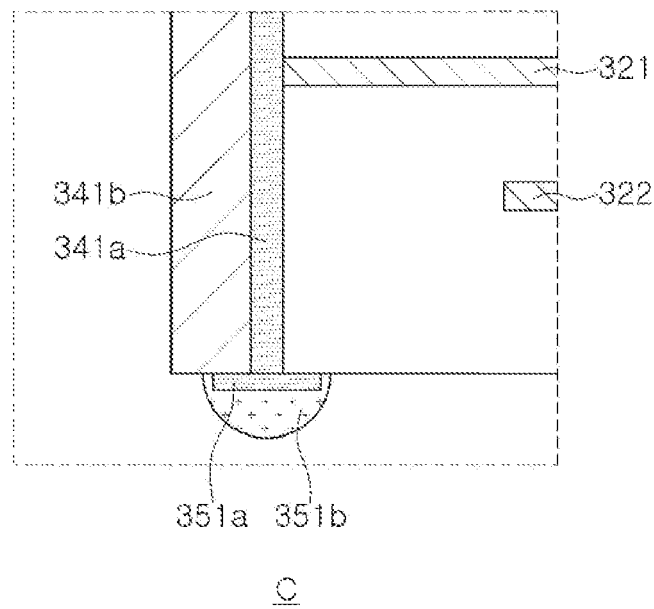
Figure 22B:
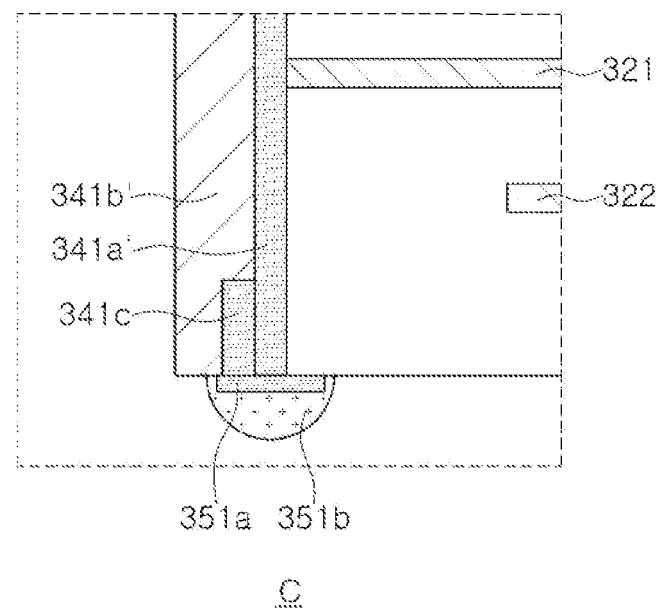
Figure 23:
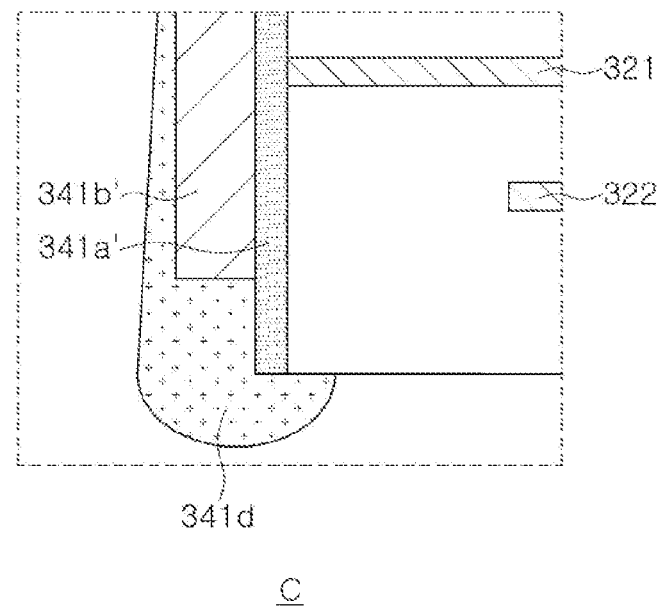
Figure 24:
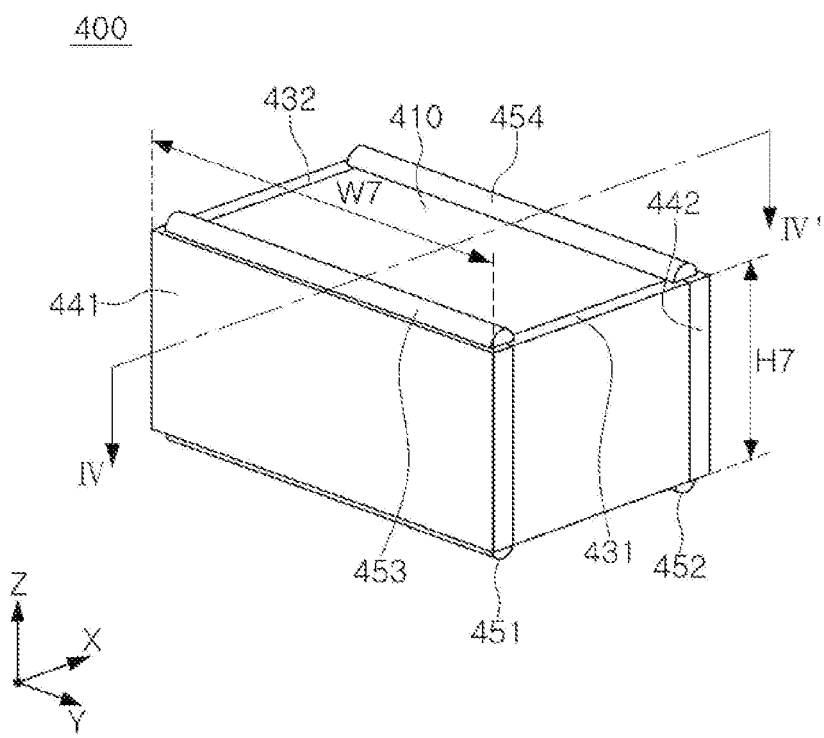
FIG. 24 is a schematic perspective view illustrating a multilayer ceramic electronic component according to another exemplary embodiment in the present disclosure.
Figure 25:
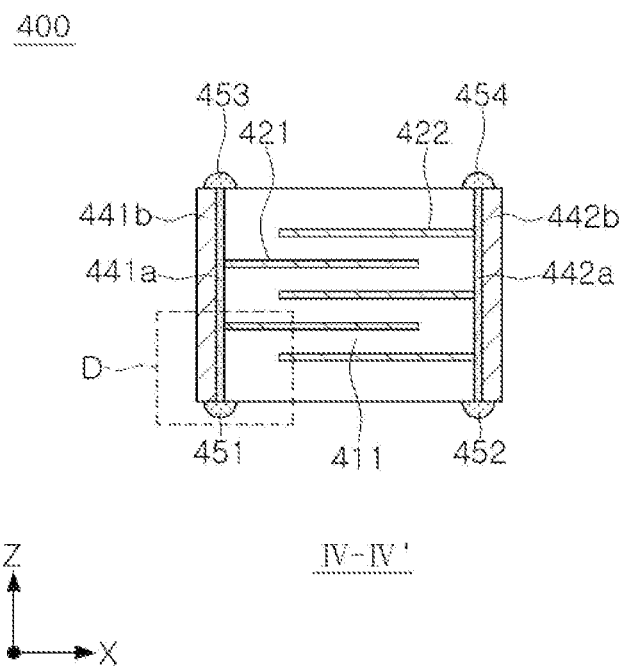
FIG. 25 is a cross-sectional view taken along line IV-IV' of FIG. 24.
Figure 26:
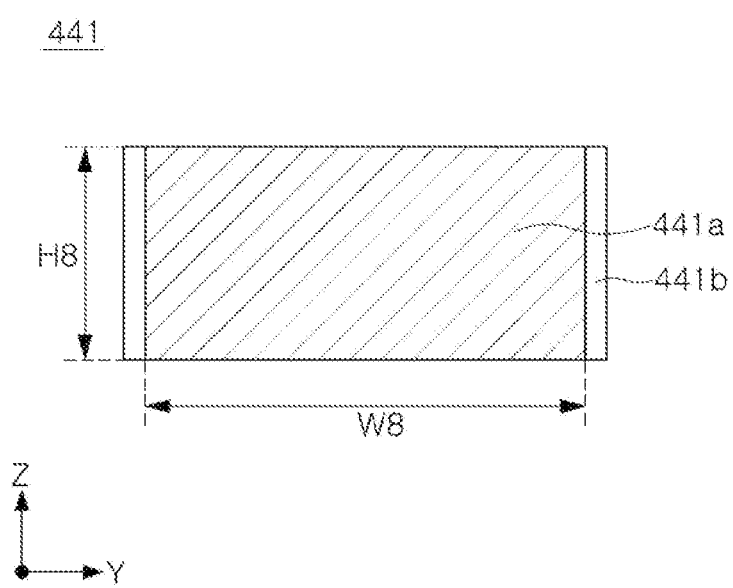
FIG. 26 is a view illustrating an interior of a first connection portion of FIG. 24.
Figure 27A:
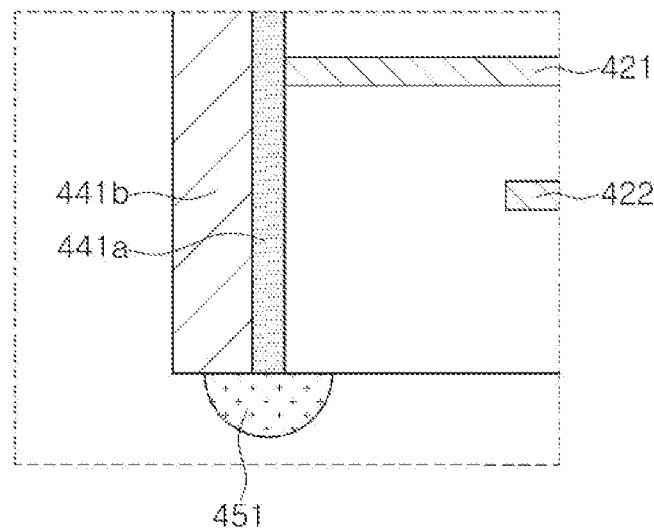
FIG. 27A is an enlarged view of region D of FIG. 25.
Figure 27B:
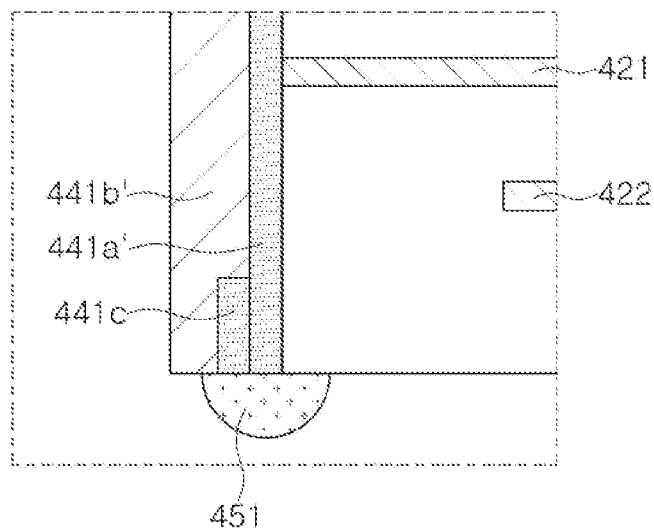
FIGS. 27B, 28A, 28B, and 29 are views illustrating modified forms of FIG. 27A.
Figure 28A:
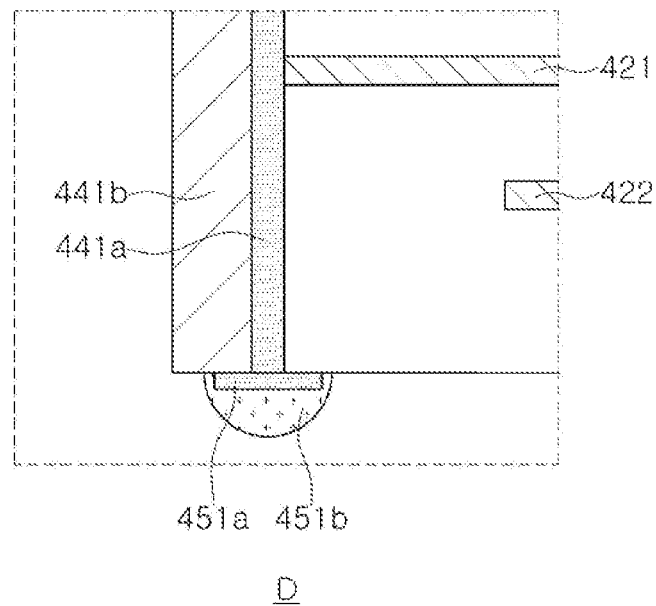
Figure 28B:
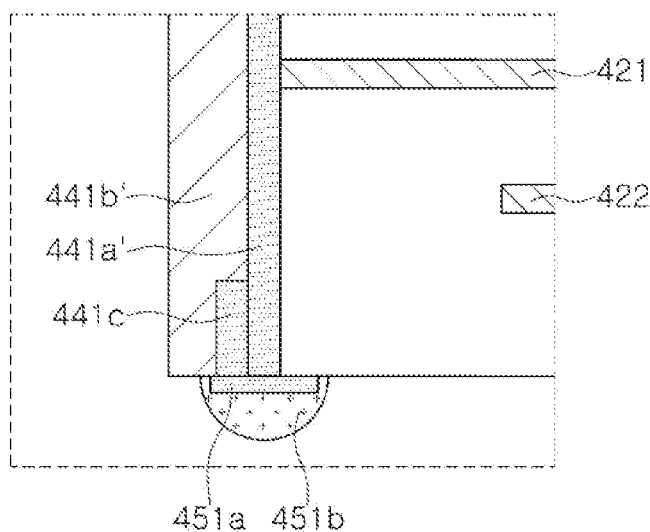
Figure 29:
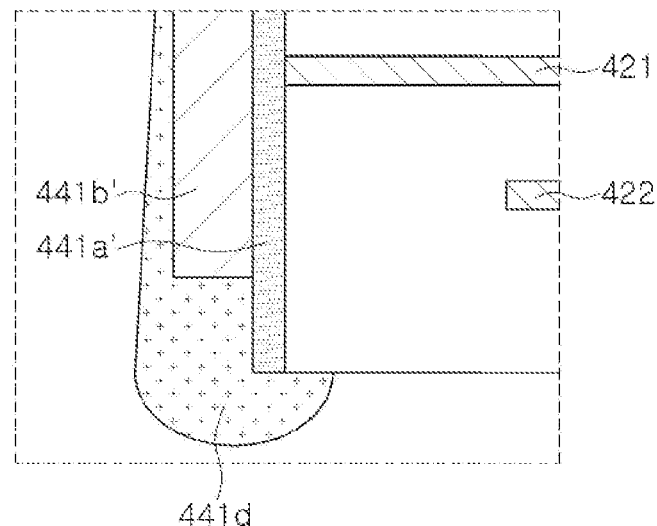
Figure 30:
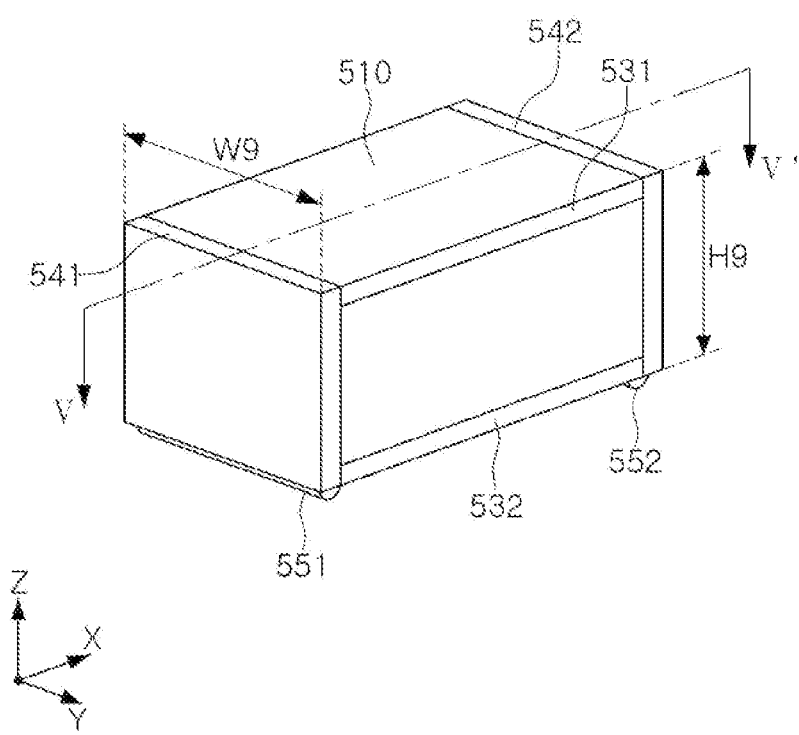
FIG. 30 is a schematic perspective view illustrating a multilayer ceramic electronic component according to another exemplary embodiment in the present disclosure.
Figure 31:
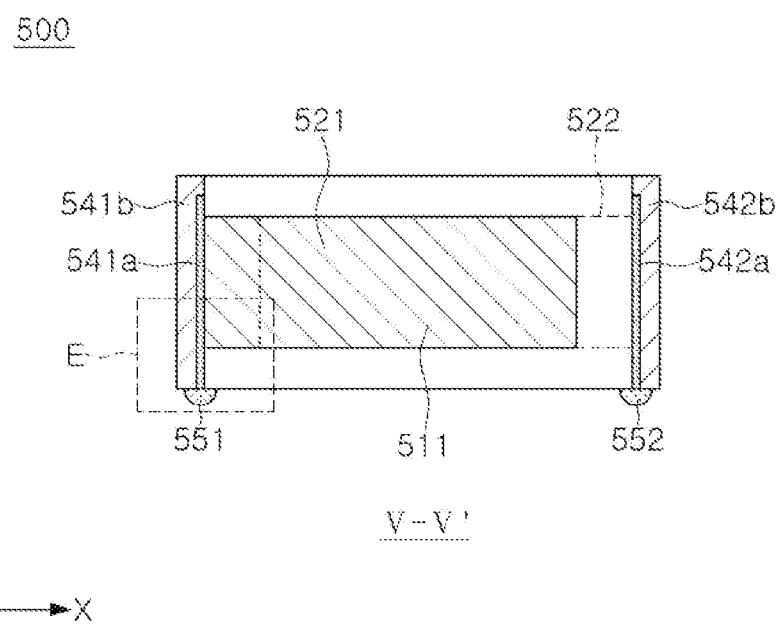
FIG. 31 is a cross-sectional view taken along line V-V' of FIG. 30.
Figure 32:
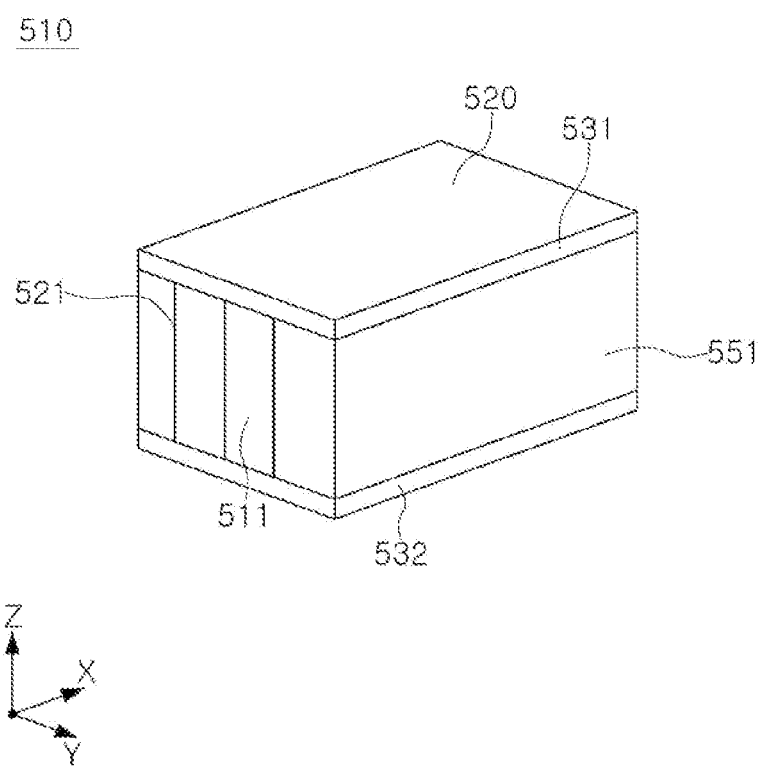
FIG. 32 is a schematic perspective view illustrating a ceramic body of FIG. 30.
Figure 33:
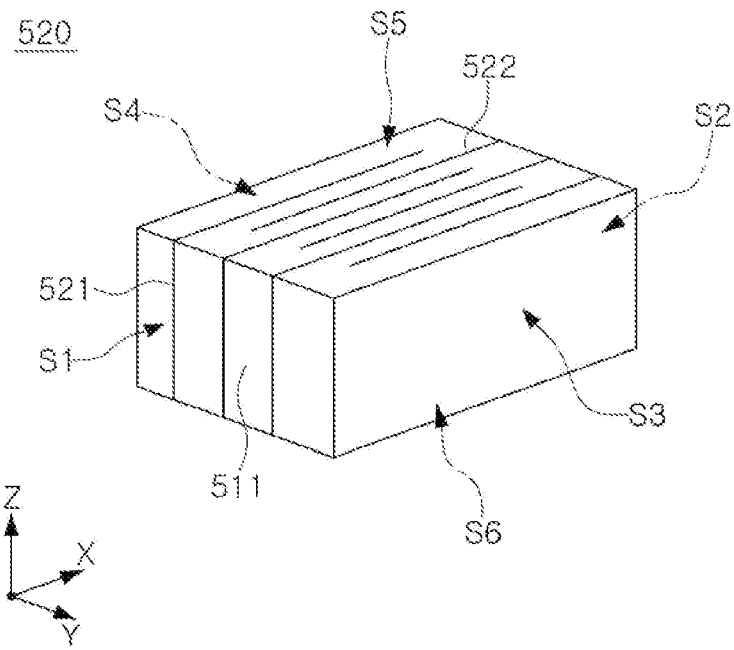
FIG. 33 is a schematic perspective view illustrating a laminate body of FIG. 32.
Figure 34:
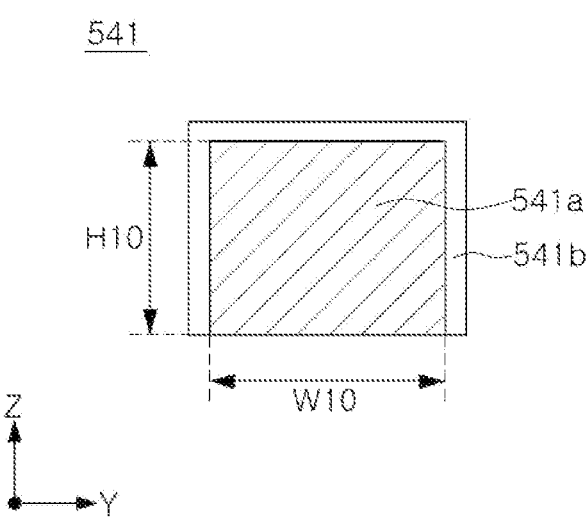
FIG. 34 is a view illustrating an interior of a first connection portion of FIG. 30.
Figure 35A:
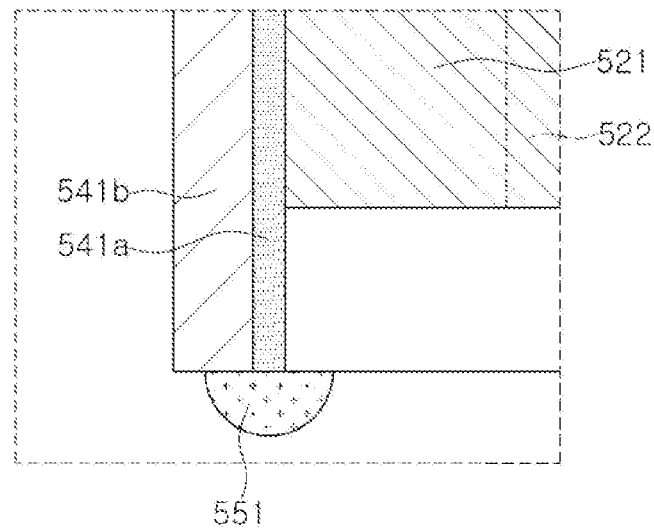
FIG. 35A is an enlarged view of region E of FIG. 31.
Figure 35B:
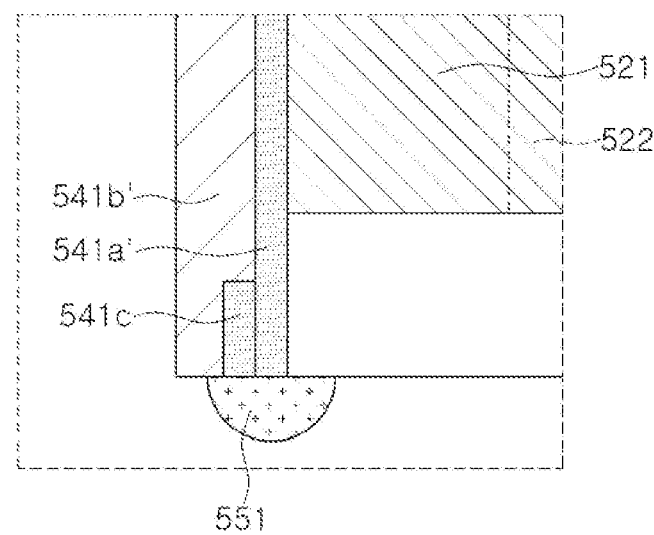
FIGS. 35B, 36A, 36B, and 37 are views illustrating modified forms of FIG. 35A.
Figure 36A:
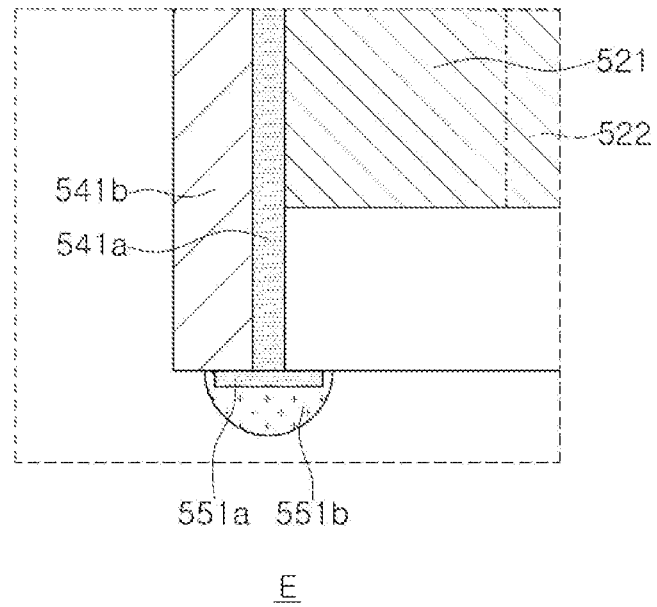
Figure 36B:
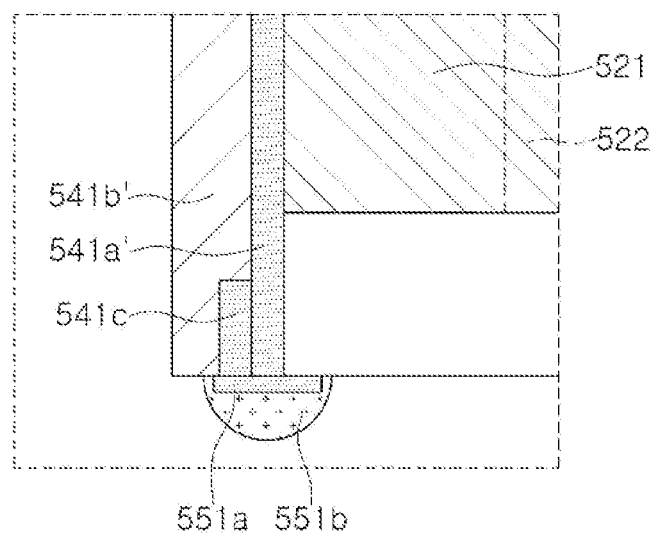
Figure 37:
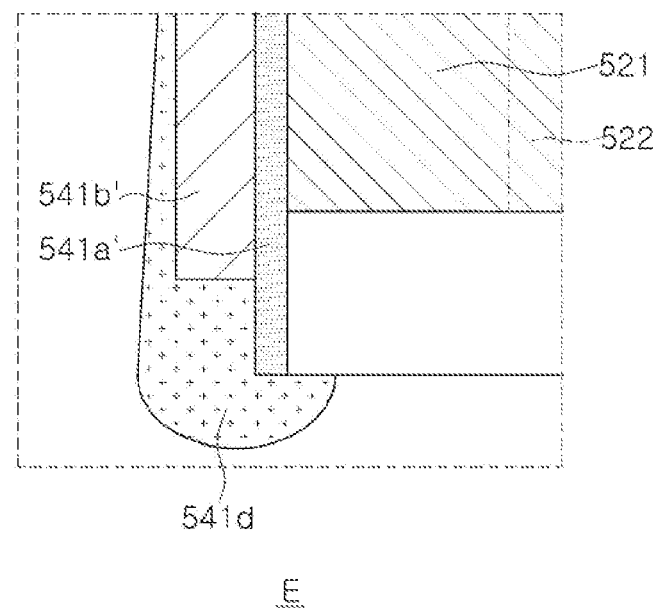
Figure 38:
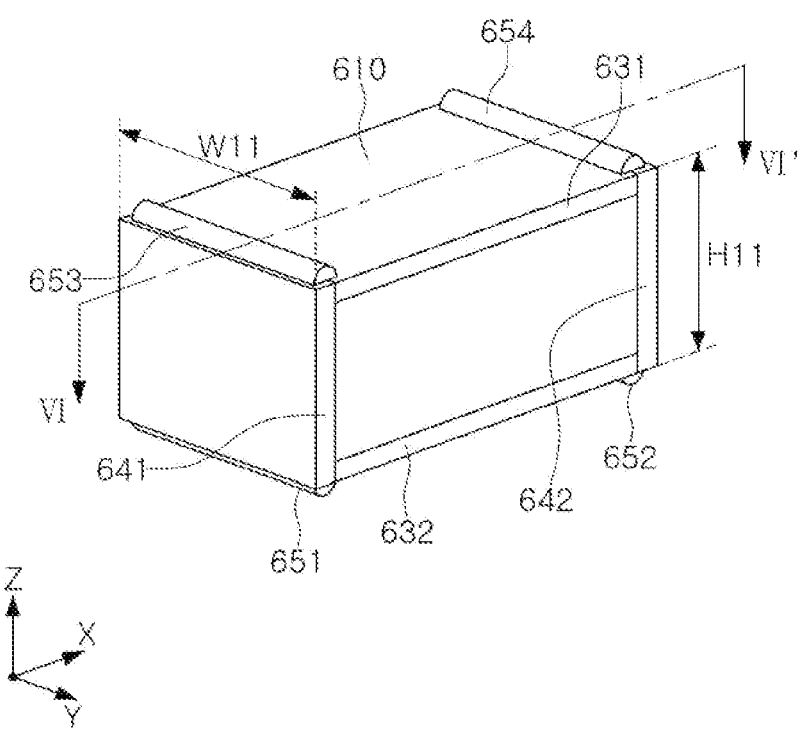
FIG. 38 is a schematic perspective view illustrating a multilayer ceramic electronic component according to another exemplary embodiment in the present disclosure.
Figures 39, 40:
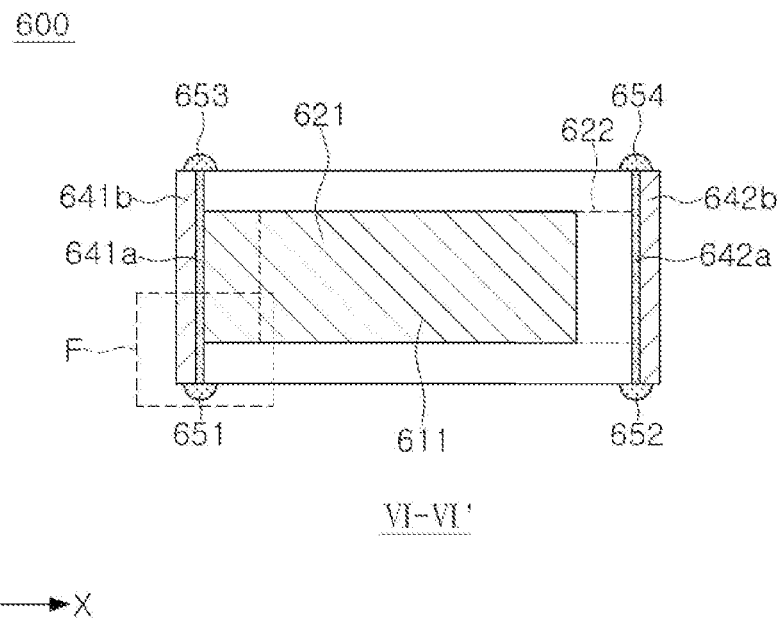
FIG. 39 is a cross-sectional view taken along line VI-VI' of FIG. 38.
FIG. 40 is a view illustrating an interior of a first connection portion of FIG. 38.
Figure 41A:
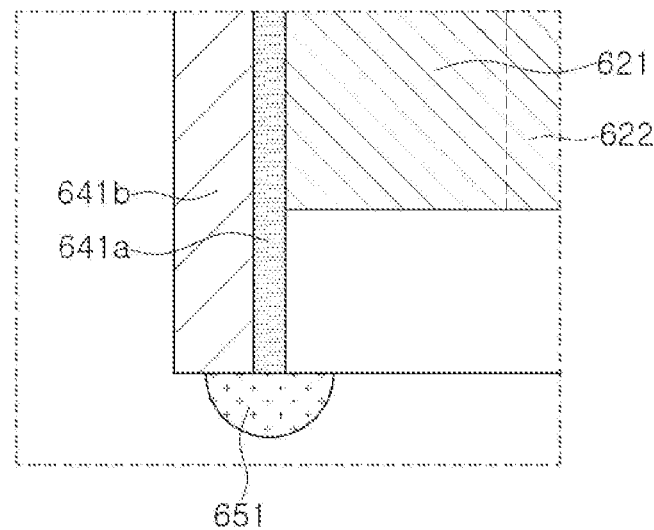
FIG. 41A is an enlarged view of region F of FIG. 39.
Figure 41B:
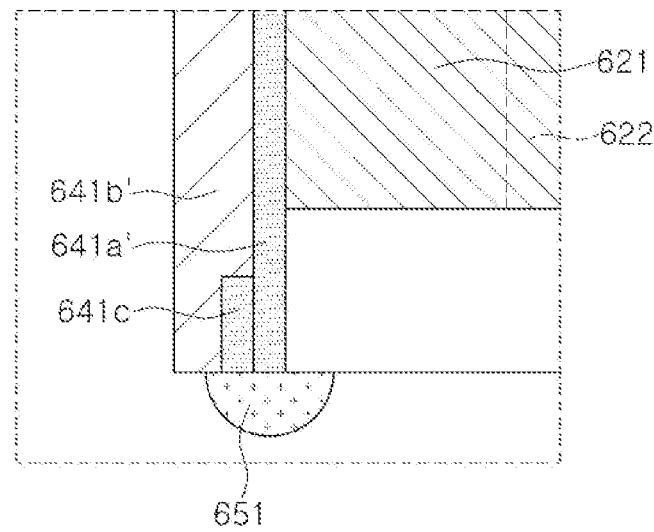
FIGS. 41B, 42A, 42B, and 43 are views illustrating modified forms of FIG. 41A.
Figure 42A:
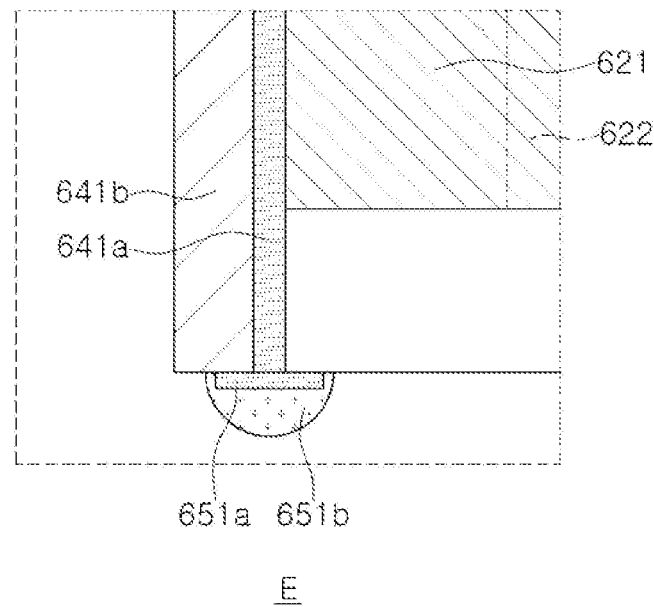
Figure 42B:
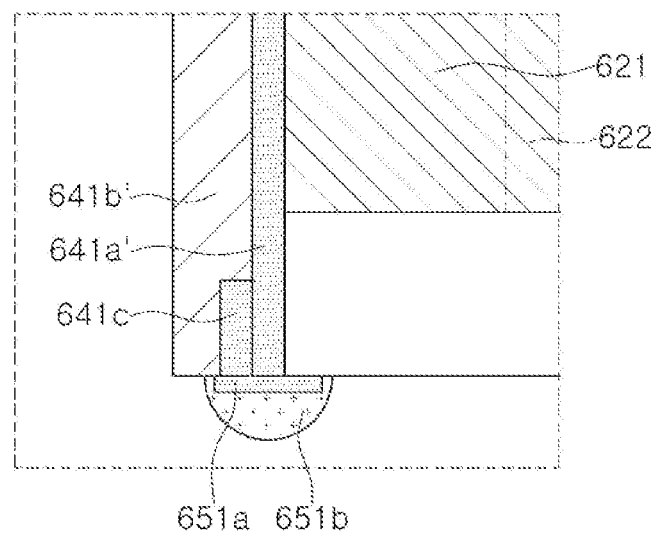
Figure 43:
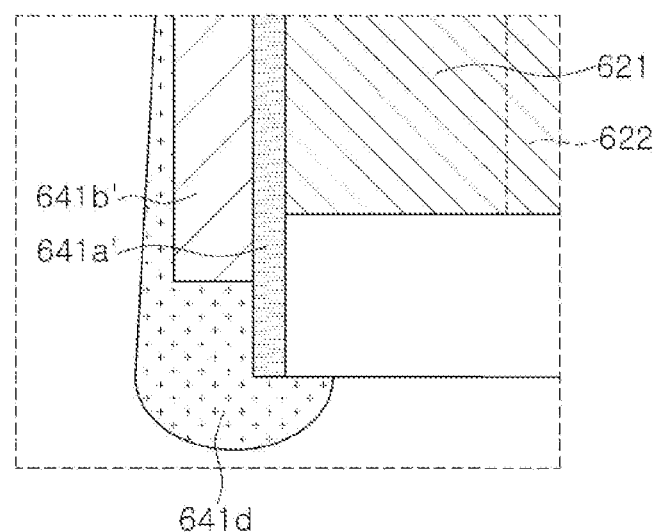
Figure 44:
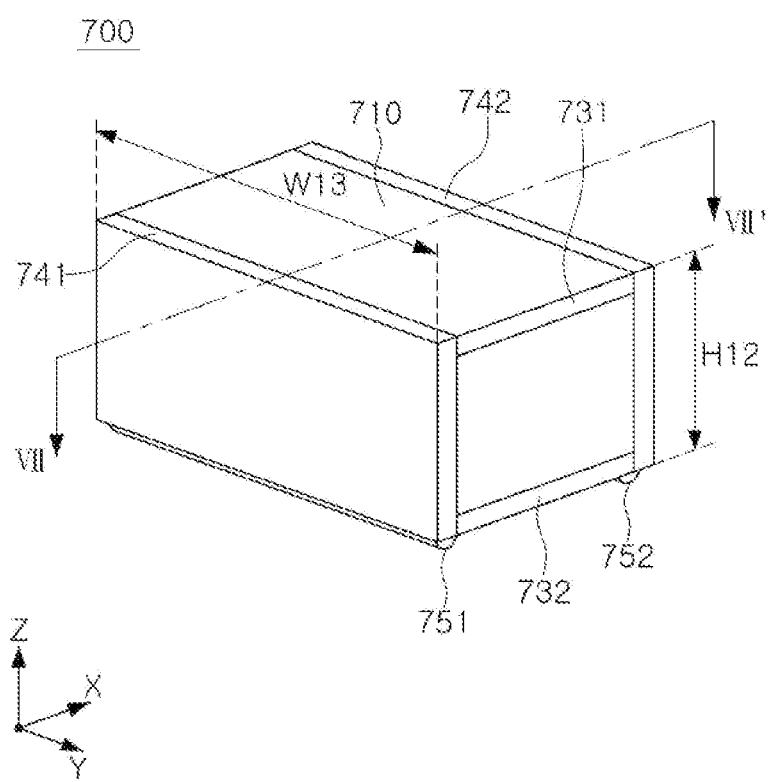
FIG. 44 is a schematic perspective view illustrating a multilayer ceramic electronic component according to another exemplary embodiment in the present disclosure.
Figure 45:
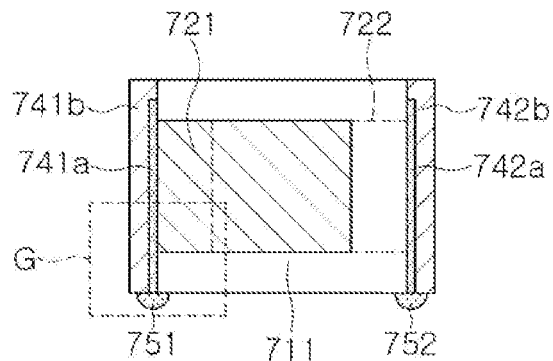
FIG. 45 is a cross-sectional view taken along line VII-VII' of FIG. 44.
Figure 46:
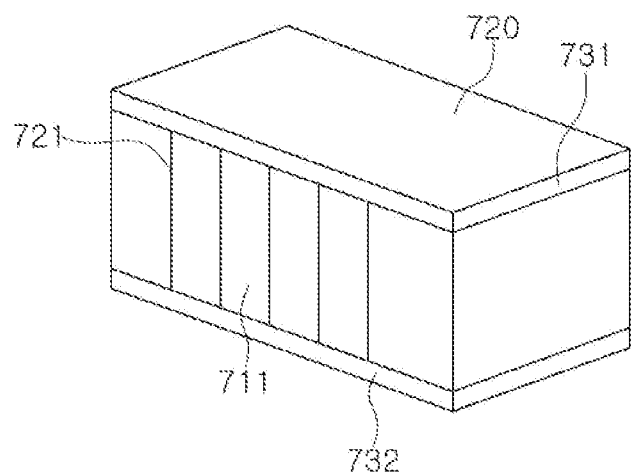
FIG. 46 is a schematic perspective view illustrating a ceramic body of FIG. 44.
Figure 47:
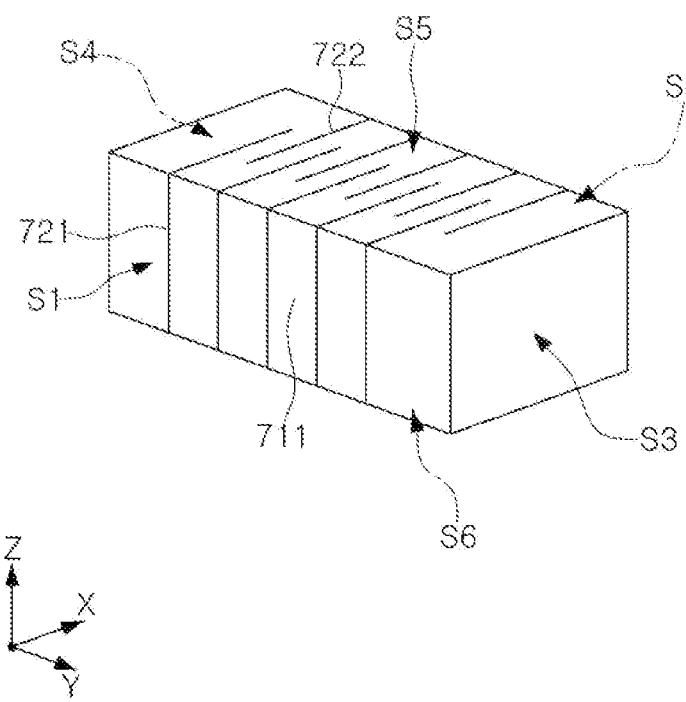
FIG. 47 is a schematic perspective view illustrating a laminate body of FIG. 46.
Figure 48:
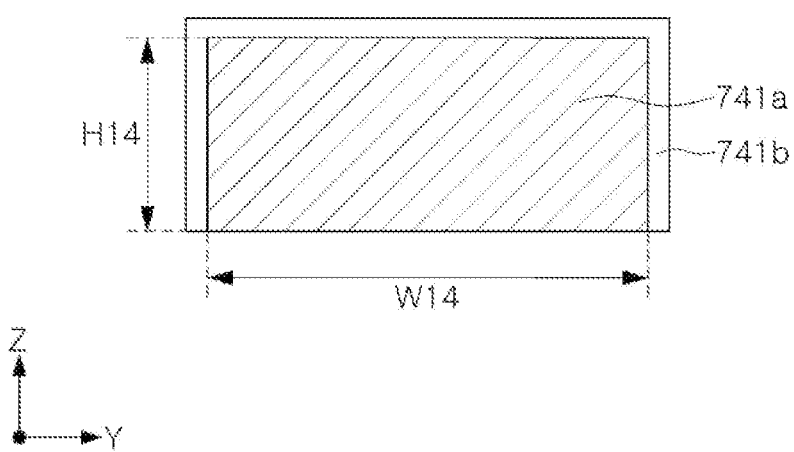
FIG. 48 is a view illustrating an interior of a first connection portion of FIG. 44.
Figure 49A:
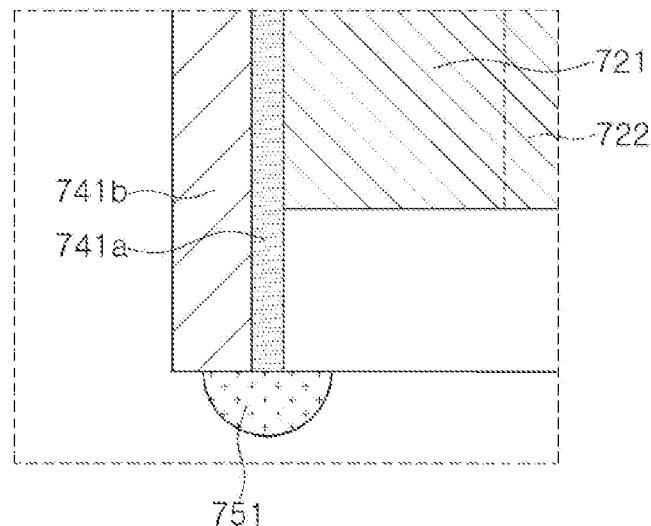
FIG. 49A is an enlarged view of region G of FIG. 45.
Figure 49B:
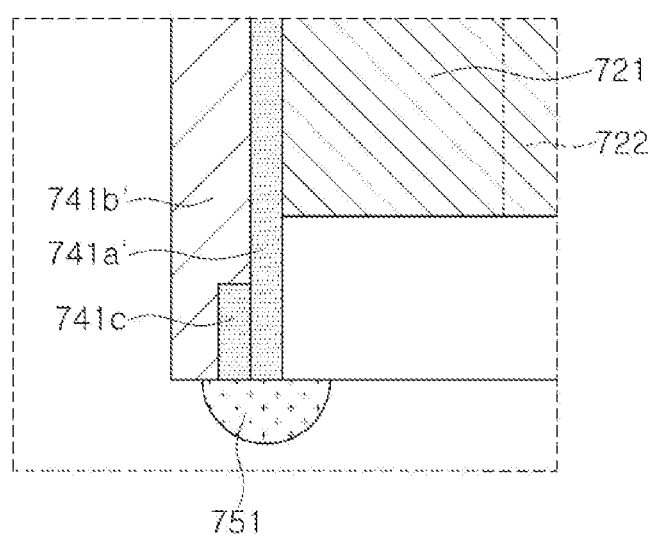
FIGS. 49B, 50A, 50B, and 51 are views illustrating modified forms of FIG. 49A.
Figure 50A:
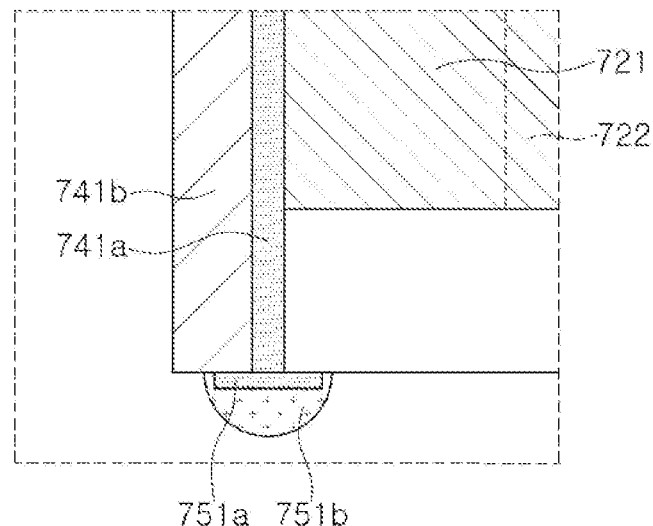
Figure 50B:
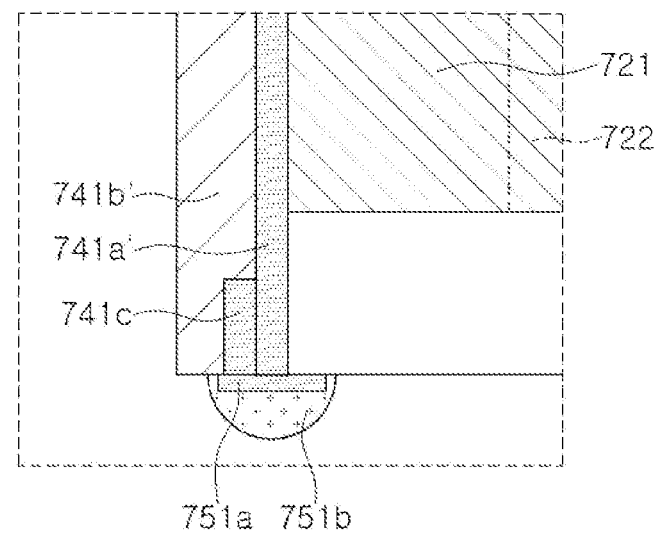
Figure 51:
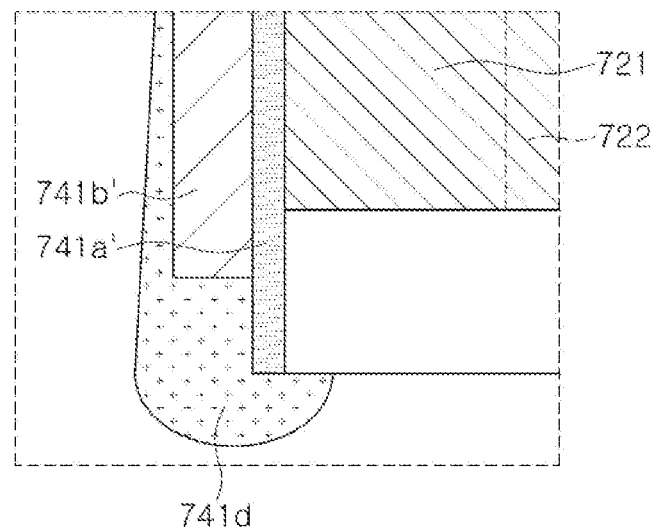
Figure 52:
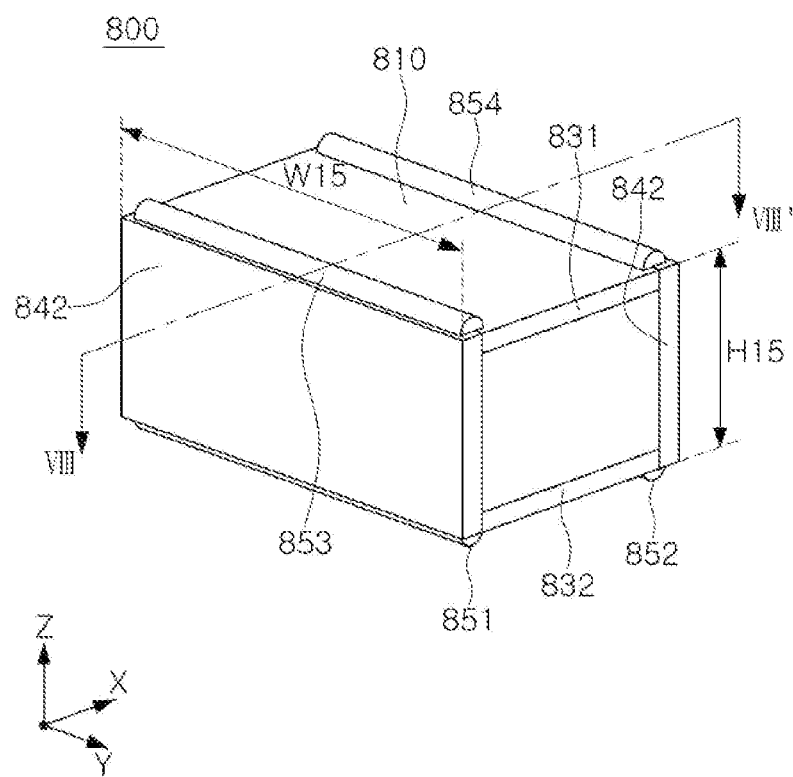
FIG. 52 is a schematic perspective view illustrating a multilayer ceramic electronic component according to another exemplary embodiment in the present disclosure.
Figure 53:
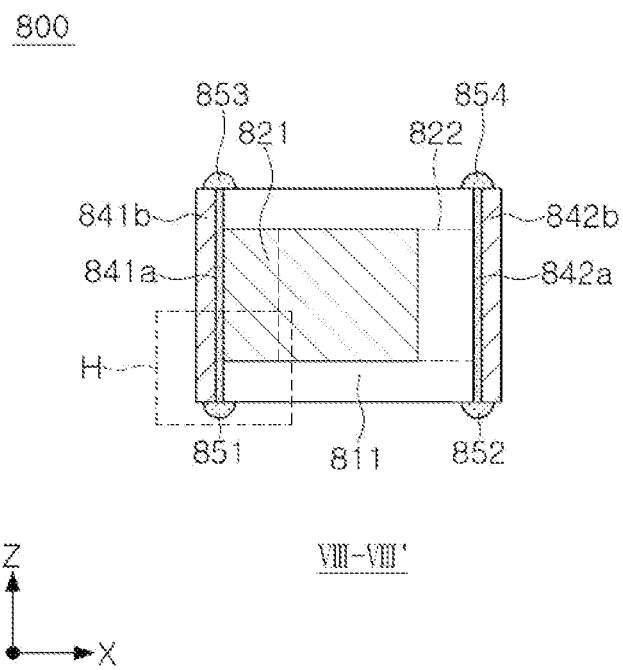
FIG. 53 is a cross-sectional view taken along line VIII-VIII' of FIG. 52.
Figure 54:
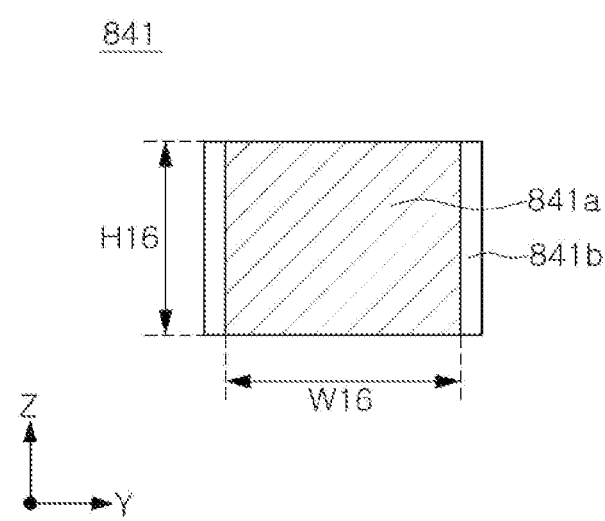
FIG. 54 is a view illustrating an interior of a first connection portion of FIG. 52.
Figure 55A:
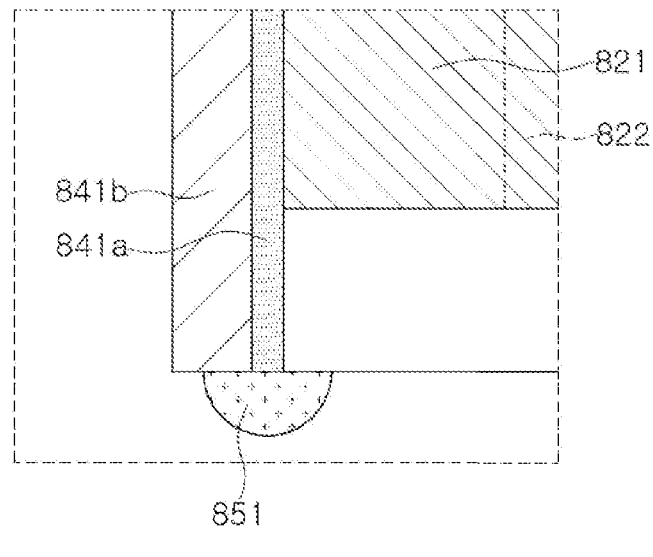
FIG. 55A is an enlarged view of region H of FIG. 53.
Figure 55B:
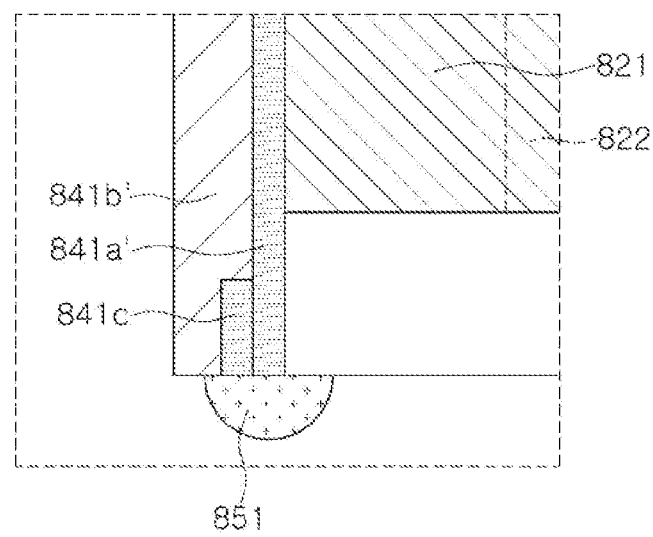
FIGS. 55B, 56A, 56B, and 57 are views illustrating modified forms of FIG. 55A.
Figure 56A:
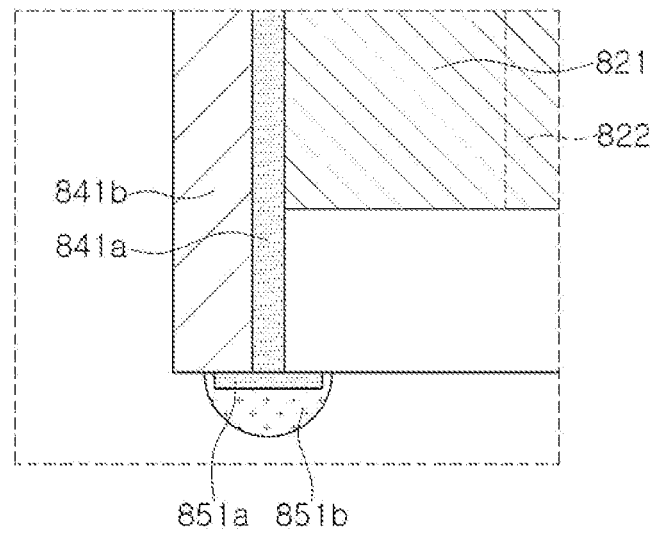
Figure 56B:
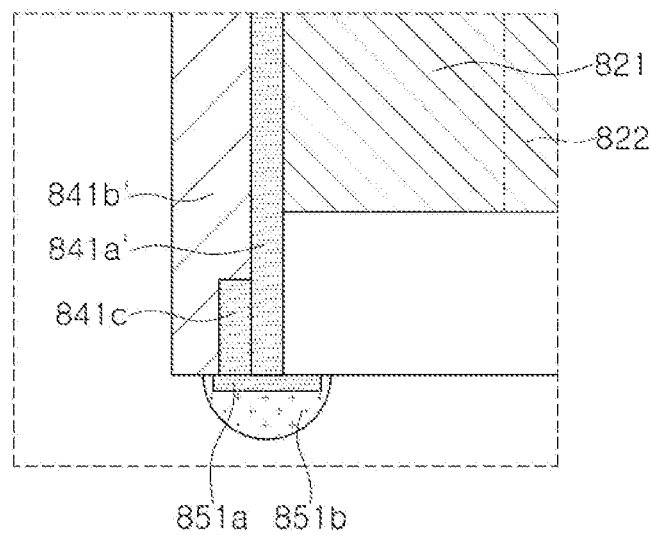
Figure 57:
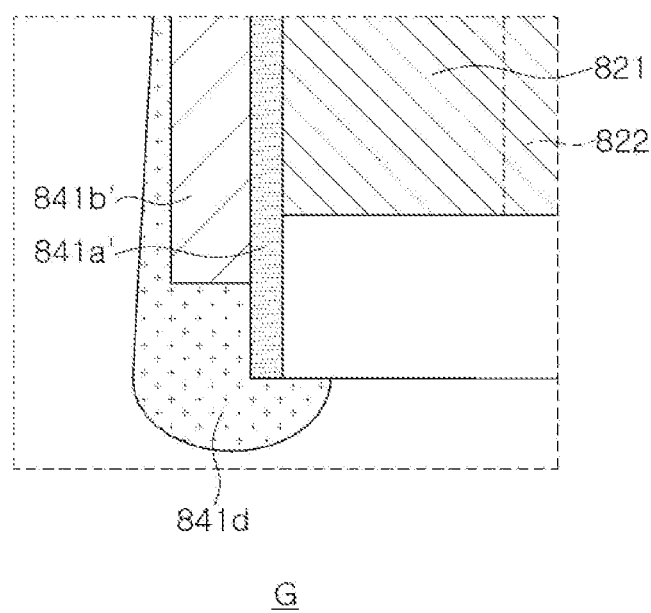

In a modified form of the present disclosure, the multilayer ceramic electronic component 100 according to the present disclosure may have at least portions of the first lead electrode 141a' and the second lead electrode exposed in the first direction (X direction), and may include a first connection electrode 141d disposed to cover the first lead electrode 141a' and the first ceramic layer 141b', and a second connection electrode disposed to cover the second lead electrode and the second ceramic layer. FIG. 9 is a view illustrating the first connection portion 141 of the present modified form. The contents illustrated in FIG. 9 may be equally applied to the second connection portion 142. Referring to FIG. 9, a portion of the first ceramic layer 141a' may be removed, and the first lead electrode 141a may be exposed in a first direction (X direction) to a position where the first ceramic layer 141a' is removed. The first connection electrode 141d of the present modified form may be disposed to cover both the exposed first lead electrode 141a' and the first ceramic layer 141b' from which the partial region is removed. When the connection portion has the shape as illustrated in FIG. 9, the multilayer ceramic electronic component 100 according to the present disclosure may be applied to a structure that is to be mounted through the side surface.

The first connection electrode 141d and the second connection electrode may be formed before or after sintering of the ceramic body 110. An example of the method of forming the connection electrodes before sintering of the ceramic body 110 may include, for example, a method of partially forming the first ceramic layer 141b and the second ceramic layer 142b on the first lead electrode 141a and the second lead electrode 142a, and then sintering the first ceramic layer 141b and the second ceramic layer 142b, but is not limited thereto. In addition, an example of the method of forming the connection electrodes after sintering of the ceramic body 110 may include a method of forming the connection electrodes on the exposed lead electrodes after naturally removing some regions of the first ceramic layer 141b and the second ceramic layer 142b during the sintering process using a high carbon binder material, but is not limited thereto.

According to another exemplary embodiment in the present disclosure, a first lead electrode 241a and a second lead electrode 242a of a multilayer ceramic electronic component 200 of the present disclosure may be led out to opposite surfaces of a ceramic body 210 in a third direction (Z direction). FIGS. 10 through 15 are schematic views illustrating a multilayer ceramic electronic component 200 according to the present exemplary embodiment. Referring to FIGS. 10 through 15, in the multilayer ceramic electronic component 200 according to the present exemplary embodiment, a first connection portion 241 and a second connection portion 242 may be disposed on opposite surfaces of a laminate body 220 in a first direction (X direction) where a first margin portion 231 and a second margin portion 232 are disposed on opposite surfaces in a second direction (Y direction). Here, the first connection portion 241 may include a first lead electrode 241a and a first ceramic layer 241b, the second connection portion 242 may include a second lead electrode 242a and a second ceramic layer 242b, and the first lead electrode 241a and the second lead electrode 242a may be respectively led out to opposite surfaces in the third direction (Z direction). That is, the multilayer ceramic electronic component 200 according to the present exemplary embodiment may have a structure in which the lead electrodes of the same polarity are respectively lead out to two locations, i.e., the lead electrodes are led out to a total of four locations.

In the present exemplary embodiment, a maximum value W4 of a width of the first lead electrode 241a and/or the second lead electrode 242a of the multilayer ceramic electronic component 200 in the second direction (Y direction) may be smaller than a maximum value W3 of a width of the ceramic body 210 in the second direction (Y direction).

In an example, a maximum value H4 of a height of the first lead electrode 241a and the second lead electrode 242a of the multilayer ceramic electronic component 200 according to the present disclosure in the third direction (Z direction) may be equal to a maximum value H3 of a height of the ceramic body 210 in the third direction (Z direction). In the present specification, the meaning of a certain length, width and/or height being the same is premised on including an error range. Here, the error range may mean |H4−H3|/H3 or |H4−H3|/H4 to be, for example, 3% or less, 2% or less, or 1% or less, but is not limited thereto. The descriptions of a maximum value W4 of a width of the first lead electrode 241a and/or the second lead electrode 242a in the second direction (Y direction), a maximum value W3 of a width of the ceramic body 210 in the second direction (Y direction), a maximum value H4 of a height of the first lead electrode 241a and the second lead electrode 242a in the third direction (Z direction), a maximum value H3 of the ceramic body 210 in the third direction (Z direction), and heights and widths of the first ceramic layer 241b and the second ceramic layer 242b in the third direction (Z direction) and the second direction (Y direction) are the same as those described above, and thus will be omitted.

The modified form described above may also be applied to the present exemplary embodiment. FIGS. 13A through 15 are schematic views illustrating a modified form of the first connection portion 241. The shape and structure of the first connection portion 241 illustrated in FIGS. 13A through 15 may be equally applied to all of the connection portions of the present exemplary embodiment arranged at four locations. Referring to FIGS. 13A through 15, the first connection portion 241 of the multilayer ceramic electronic component 200 according to the present modified form may include a first auxiliary electrode 241c disposed to be in contact with a first lead electrode 241a', and the second connection portion 242 may include a second auxiliary electrode disposed to be in contact with a second lead electrode.

According to another modified form, the multilayer ceramic electronic component 200 of the present disclosure may include a first terminal electrode 251a connected to the first lead electrode 241a, and a second terminal electrode connected to the second lead electrode.

According to another modified form of the present disclosure, the first connection portion 241 of the multilayer ceramic electronic component 200 of the present disclosure may include a first auxiliary electrode 241c disposed to be in contact with a first lead electrode 241a', and the second connection portion may include a second auxiliary electrode disposed to be in contact with a second lead electrode. The multilayer ceramic electronic component 200 of the present disclosure may include a first terminal electrode 251a connected to the first lead electrode 241a', and a second terminal electrode connected to the second lead electrode. In this case, the first terminal electrode 251a and the second terminal electrode 252a may be disposed to be spaced apart from each other on a surface from which the first lead electrode 241a' and the second lead electrode are led.

In another modified form of the present disclosure, the multilayer ceramic electronic component 200 of the present disclosure may have at least portions of the first lead electrode 241a and the second lead electrode exposed in the first direction (X direction), and may include a first connection electrode 241d disposed to cover the first lead electrode 241a and the first ceramic layer 241b, and a second connection electrode disposed to cover the second lead electrode and the second ceramic layer.

In addition, the multilayer ceramic electronic component 200 according to the present disclosure may include plating layers 251, 252, 253, and 254 disposed on each lead electrode, respectively. Descriptions of the lead electrode, the ceramic layer, the auxiliary electrode, the terminal electrode, the plating layer, and the connection electrode are the same as those described above, and thus will be omitted.

In one example, the multilayer ceramic electronic component 100 according to the present disclosure may have a length in the first direction (X direction) greater than a width in the second direction (Y direction). FIGS. 1 through 15 illustrate the multilayer ceramic electronic component 100 based on a structure of the present example. The structure of the example is a structure in which the length in the first direction (X direction) is greater than the width in the second direction (Y direction), and corresponds to a structure in which electrodes connected to the outside are disposed at both end portions in the first direction (X direction), a so-called MLCC structure. When the multilayer ceramic electronic component according to the present disclosure has the structure described above, the capacity may be significantly increased while improving moisture resistance reliability.

In another example, a multilayer ceramic electronic component 300 according to the present disclosure may have a length in the first direction (X direction) smaller than a width in the second direction (Y direction). FIGS. 16 through 23 are views illustrating a multilayer ceramic electronic component 300 according to the present example. Referring to FIGS. 16 through 23, the multilayer ceramic electronic component 300 of the present example may have a structure in which the length in the first direction (X direction) is smaller than the width in the second direction (Y direction), a first connection portion 341 may include a first auxiliary electrode 341c disposed to be in contact with a first lead electrode 341a, and a second connection portion 342 may include a second auxiliary electrode disposed to be in contact with a second lead electrode 342a. Such a form is a structure in which a distance between the electrodes connected to the outside is relatively short, and corresponds to a so-called LICC structure. When the multilayer ceramic electronic component according to the present disclosure has the structure described above, a chip having excellent moisture resistance reliability and low ESL may be implemented.

In the present example, a maximum value W6 of a width of the first lead electrode 341a and/or the second lead electrode 342a of the multilayer ceramic electronic component 300 in the second direction (Y direction) may be smaller than a maximum value W5 of a width of a ceramic body 310 in the second direction (Y direction).

In one example, a maximum value H6 of a height of the first lead electrode 341a and/or the second lead electrode 342a according to the present disclosure in the third direction (Z direction) may be smaller than a maximum value H5 of a height of the ceramic body 310 in the third direction (Z direction). When the maximum value H6 of the height of the first lead electrode 341a and/or the second lead electrode 342a in the third direction (Z direction) is smaller than the maximum value H5 of the height of the ceramic body 310 in the third direction (Z direction), the possibility of moisture penetration may be reduced by exposing the first lead electrode 341a and/or the second lead electrode 342a to only one surface of the multilayer ceramic electronic component 300 according to the present disclosure in the third direction (Z direction).

The descriptions of a maximum value W6 of a width of the first lead electrode 341a and/or the second lead electrode 342a in the second direction (Y direction), a maximum value W5 of a width of the ceramic body 310 in the second direction (Y direction), a maximum value H6 of a height of the first lead electrode 341a and the second lead electrode 342a in the third direction (Z direction), a maximum value H5 of the ceramic body 310 in the third direction (Z direction), and heights and widths of the first ceramic layer 341b and the second ceramic layer 342b in the third direction (Z direction) and the second direction (Y direction) are the same as those described above, and thus will be omitted.

In the example described above, the multilayer ceramic electronic component 300 of the present disclosure may include a first terminal electrode 351a connected to the first lead electrode 341a, and a second terminal electrode 352a connected to the second lead electrode 342a.

According to a modified form of the example, the first connection portion 341 of the multilayer ceramic electronic component 300 of the present disclosure may include a first auxiliary electrode 341c disposed to be in contact with a first lead electrode 341a, and the second connection portion 342 may include a second auxiliary electrode disposed to be in contact with a second lead electrode 342a. The multilayer ceramic electronic component 300 of the present disclosure may include a first terminal electrode 351a connected to the first lead electrode 341a, and a second terminal electrode 352a connected to the second lead electrode 342a. In this case, the first terminal electrode 351a and the second terminal electrode 352a may be disposed to be spaced apart from each other on a surface from which the first lead electrode 341a and the second lead electrode 342a are led.

In another modified form of the example, the multilayer ceramic electronic component 300 of the present disclosure may have at least portions of the first lead electrode 341a and the second lead electrode 342a exposed in the first direction (X direction), and may include a first connection electrode 341d disposed to cover the first lead electrode 341a and the first ceramic layer 341b, and a second connection electrode disposed to cover the second lead electrode 342a and the second ceramic layer 342b.

In addition, the multilayer ceramic electronic component 300 according to the present disclosure may include plating layers (351, 352, and 351b are labeled in the drawings), disposed on each lead electrode, respectively. The descriptions of the lead electrode, the ceramic layer, the auxiliary electrode, the terminal electrode, the plating layer, and the connection electrode are the same as those described above, and thus will be omitted.

In another modified form of the present example, a first lead electrode 441a and a second lead electrode 442a of a multilayer ceramic electronic component 400 of the present disclosure may be led out to opposite surfaces of a ceramic body 410 in a third direction (Z direction). FIGS. 24 through 29 are schematic views illustrating a multilayer ceramic electronic component 400 according to the present example. Referring to FIGS. 24 through 29, in the multilayer ceramic electronic component 400 according to the present exemplary embodiment, a first connection portion 441 and a second connection portion 442 may be disposed on opposite surfaces of a ceramic body 410 in a first direction (X direction) where a first margin portion 431 and a second margin portion 432 are disposed on opposite surfaces in a second direction (Y direction). Here, the first connection portion 441 may include a first lead electrode 441a and a first ceramic layer 441b, the second connection portion 441 may include a second lead electrode 442a and a second ceramic layer 442b, and the first lead electrode 441a and the second lead electrode 442a may be respectively lead out to opposite surfaces in the third direction (Z direction).

In the present example, a maximum value W8 of a width of the first lead electrode 441a and/or the second lead electrode 442a of the multilayer ceramic electronic component 400 in the second direction (Y direction) may be smaller than a maximum value W7 of a width of the ceramic body 410 in the second direction (Y direction).

In one example, a maximum value H8 of a height of the first lead electrode 441a and the second lead electrode 442a of the multilayer ceramic electronic component 400 according to the present disclosure in the third direction (Z direction) may be equal to a maximum value H7 of a height of the ceramic body 410 in the third direction (Z direction). The descriptions of a maximum value W8 of a width of the first lead electrode 441a and/or the second lead electrode 442a in the second direction (Y direction), a maximum value W7 of a width of the ceramic body 410 in the second direction (Y direction), a maximum value H8 of a height of the first lead electrode 441a and the second lead electrode 442a in the third direction (Z direction), a maximum value H7 of the ceramic body 410 in the third direction (Z direction), and heights and widths of the first ceramic layer 441b and the second ceramic layer 442b in the third direction (Z direction) and the second direction (Y direction) are the same as those described above, and thus will be omitted.

The modified form described above may also be applied to the present exemplary embodiment. FIGS. 27A through 29 are schematic views illustrating a modified form of the first connection portion 441. The shape and structure of the first connection portion 441 illustrated in FIGS. 27A through 29 may be equally applied to all of the connection portions of the present exemplary embodiment arranged at four locations. Referring to FIGS. 27A through 29, the first connection portion 441 of the multilayer ceramic electronic component 400 according to the present modified form may include a first auxiliary electrode 441c disposed to be in contact with a first lead electrode 441a, or may include a first terminal electrode 451a connected to the first lead electrode 441a, or may include the first auxiliary electrode 441c and the first terminal electrode 451a together.

In addition, the multilayer ceramic electronic component 400 may have at least portions of the first lead electrode 441a and the second lead electrode 442a exposed in the first direction (X direction), and may include a first connection electrode 441d disposed to cover the first lead electrode 441a and the first ceramic layer 441b, and a second connection electrode disposed to cover the second lead electrode 442a and the second ceramic layer 442b.

In addition, the multilayer ceramic electronic component 400 according to the present disclosure may include plating layers disposed on each lead electrode, respectively. The descriptions of the lead electrode, the ceramic layer, the auxiliary electrode, the terminal electrode, the plating layer, and the connection electrode are the same as those described above, and thus will be omitted.

According to another exemplary embodiment in the present disclosure, a multilayer ceramic electronic component 500 according to the present disclosure may have first internal electrodes 521 and second internal electrodes 522 stacked in the second direction (Y direction). FIGS. 30 through 37 are views illustrating a multilayer ceramic electronic component 500 according to the present exemplary embodiment. Referring to FIGS. 30 through 37, first and second margin portions 531 and 532 may be disposed on opposite surfaces of a laminate body 520 of the multilayer ceramic electronic component 500 of the present example in the third direction (Z direction), respectively, and in the laminate body 520, a dielectric layer and the first and second internal electrodes 521 and 522 may be sequentially stacked in the second direction (Y direction). A first connection portion 541 and a second connection portion 542 may be disposed on opposite surfaces of the ceramic body 510 in the first direction (X direction), respectively. The first connection portion 541 may include a first lead electrode 541a and a first ceramic layer 541b, and the second connection portion 542 may include a second lead electrode 542a and a second ceramic layer 542b. In this case, the first lead electrode 541a and the second lead electrode 542a may be led out to any one surface in the third direction (Z direction).

In the present exemplary embodiment, a maximum value W10 of a width of the first lead electrode 541a and/or the second lead electrode 542a of the multilayer ceramic electronic component 500 in the second direction (Y direction)

may be smaller than a maximum value W9 of a width of the ceramic body 510 in the second direction (Y direction).

In one example, a maximum value H10 of a height of the first lead electrode 541a and/or the second lead electrode 542a according to the present disclosure in the third direction (Z direction) may be smaller than a maximum value H9 of a height of the ceramic body 510 in the third direction (Z direction). When the maximum value H10 of the height of the first lead electrode 541a and/or the second lead electrode 542a in the third direction (Z direction) is smaller than the maximum value H9 of the height of the ceramic body 510 in the third direction (Z direction), the possibility of moisture penetration may be reduced by exposing the first lead electrode 541a and/or the second lead electrode 542a to only one surface of the multilayer ceramic electronic component 500 according to the present disclosure in the third direction (Z direction).

The descriptions of a maximum value W10 of a width of the first lead electrode 541a and/or the second lead electrode 542a in the second direction (Y direction), a maximum value W9 of a width of the ceramic body 510 in the second direction (Y direction), a maximum value H10 of a height of the first lead electrode 541a and the second lead electrode 542a in the third direction (Z direction), a maximum value H9 of a height of the ceramic body 510 in the third direction (Z direction), and heights and widths of the first ceramic layer 541b and the second ceramic layer 542b in the third direction (Z direction) and the second direction (Y direction) are the same as those described above, and thus will be omitted.

The modified form described above may also be applied to the exemplary embodiment. The modified form described above may also be applied to the present exemplary embodiment. FIGS. 35A through 37 are schematic views illustrating a modified form of the first connection portion 541. The shape and structure of the first connection portion 541 illustrated in FIGS. 35A through 37 may be equally applied to the second connection portion 542. Referring to FIGS. 35A through 37, the first connection portion 541 of the multilayer ceramic electronic component 500 according to the present modified form may include a first auxiliary electrode 541c disposed to be in contact with a first lead electrode 541a, or may include a first terminal electrode 551a connected to the first lead electrode 541a, or may include the first auxiliary electrode 541c and the first terminal electrode 551a together.

In addition, the multilayer ceramic electronic component 500 may have at least portions of the first lead electrode 541a and the second lead electrode 542a exposed in the first direction (X direction), and may include a first connection electrode 541d disposed to cover the first lead electrode 541a' and the first ceramic layer 541b', and a second connection electrode disposed to cover the second lead electrode and the second ceramic layer.

In addition, the multilayer ceramic electronic component 500 according to the present disclosure may include plating layers disposed on each lead electrode, respectively. The descriptions of the lead electrode, the ceramic layer, the auxiliary electrode, the terminal electrode, the plating layer, and the connection electrode are the same as those described above, and thus will be omitted.

In another modified form of the present example, a first lead electrode 641a and a second lead electrode 642a of a multilayer ceramic electronic component 600 of the present disclosure may be led out to opposite surfaces of a ceramic body 610 in a third direction (Z direction). FIGS. 38 through 43 are schematic views illustrating a multilayer ceramic electronic component 600 according to the present example. Referring to FIGS. 38 through 43, in the multilayer ceramic electronic component 600 according to the present exemplary embodiment, a first connection portion 641 and a second connection portion 642 may be disposed on opposite surfaces of a laminate body 620 in the first direction (X direction) while a first margin portion 631 and a second margin portion 632 are disposed on opposite surfaces in the third direction (Z direction). Here, the first connection portion 641 may include a first lead electrode 641a and a first ceramic layer 641b, the second connection portion 642 may include a second lead electrode 642a and a second ceramic layer 642b, and the first lead electrode 641a and the second lead electrode 642a may be respectively led out to opposite surfaces in the third direction (Z direction).

In the present example, a maximum value W12 of a width of the first lead electrode 641a and/or the second lead electrode 642a of the multilayer ceramic electronic component 600 in the second direction (Y direction) may be smaller than a maximum value W11 of a width of a ceramic body 610 in the second direction (Y direction).

In an example, a maximum value H12 of a height of the first lead electrode 641a and the second lead electrode 642a of the multilayer ceramic electronic component 600 according to the present disclosure in the third direction (Z direction) may be equal to a maximum value H11 of a height of the ceramic body 610 in the third direction (Z direction). In the present specification, the meaning of a certain length, width and/or height being the same is premised on including an error range. Here, the error range may mean |H12−H11|/H12 or |H12−H11|/H11 to be, for example, 3% or less, 2% or less, or ±1% or less, but is not limited thereto. The descriptions of a maximum value W12 of a width of the first lead electrode 641a and/or the second lead electrode 642a in the second direction (Y direction), a maximum value W11 of a width of the ceramic body 610 in the second direction (Y direction), a maximum value H12 of a height of the first lead electrode 641a and the second lead electrode 642a in the third direction (Z direction), a maximum value H11 of the ceramic body 610 in the third direction (Z direction), and heights and widths of the first ceramic layer 641b and the second ceramic layer 642b in the third direction (Z direction) and the second direction (Y direction) are the same as those described above, and thus will be omitted.

The modified form described above may also be applied to the present exemplary embodiment. FIGS. 41A through 43 are schematic views illustrating a modified form of the first connection portion 641. The shape and structure of the first connection portion 641 illustrated in FIGS. 41A through 43 may be equally applied to all of the connection portions of the present exemplary embodiment arranged at four locations. Referring to FIGS. 41A through 43, the first connection portion 641 of the multilayer ceramic electronic component 600 according to the present modified form may include a first auxiliary electrode 641c disposed to be in contact with a first lead electrode 641a, or may include a first terminal electrode 651a connected to the first lead electrode 641a, or may include the first auxiliary electrode 641c and the first terminal electrode 651a together.

In addition, the multilayer ceramic electronic component 600 may have at least portions of the first lead electrode 641a and the second lead electrode 642a exposed in the first direction (X direction), and may include a first connection electrode 641d disposed to cover the first lead electrode 641a and the first ceramic layer 641b, and a second connection electrode disposed to cover the second lead electrode 642a and the second ceramic layer 642b. In addition, the multilayer ceramic electronic component 600 according to the present disclosure may include plating layers 651, 652, 651b, and 652b disposed on each lead electrode, respectively. The descriptions of the lead electrode, the ceramic layer, the auxiliary electrode, the terminal electrode, the plating layer, and the connection electrode are the same as those described above, and thus will be omitted.

In one example, the multilayer ceramic electronic component 600 according to the present disclosure may have a length in the first direction (X direction) greater than a width in the second direction (Y direction). FIGS. 30 through 43 illustrate the multilayer ceramic electronic component 600 based on a structure of the present example. The structure of the example is a structure in which the length in the first direction (X direction) is greater than the width in the second direction (Y direction), and corresponds to a structure in which electrodes connected to the outside are disposed at both end portions in the first direction (X direction), a so-called MLCC structure.

In another example, a multilayer ceramic electronic component 700 according to the present disclosure may have a length in the first direction (X direction) smaller than a width in the second direction (Y direction). FIGS. 44 through 57 are views illustrating a multilayer ceramic electronic component 700 according to the present example. Referring to FIGS. 43 through 57, the multilayer ceramic electronic component 700 of the present example may have a structure in which the length in the first direction (X direction) is smaller than the width in the second direction (Y direction), a first connection portion 741 may include a first auxiliary electrode 741c disposed to be in contact with a first lead electrode 741a, and a second connection portion 742 may include a second auxiliary electrode 742c disposed to be in contact with a second lead electrode 742a. Such a form is a structure in which a distance between the electrodes connected to the outside is relatively short, and corresponds to a so-called LICC structure.

In the present example, a maximum value W14 of a width of the first lead electrode 741a and/or the second lead electrode 742a of the multilayer ceramic electronic component 700 in the second direction (Y direction) may be smaller than a maximum value W13 of a width of the ceramic body 710 in the second direction (Y direction).

In one example, a maximum value H14 of a height of the first lead electrode 741a and/or the second lead electrode 742a according to the present disclosure in the third direction (Z direction) may be smaller than a maximum value H13 of a height of the ceramic body 710 in the third direction (Z direction). When the maximum value H14 of the height of the first lead electrode 741a and/or the second lead electrode 742a in the third direction (Z direction) is smaller than the maximum value H13 of the height of the ceramic body 710 in the third direction (Z direction), the possibility of moisture penetration may be reduced by exposing the first lead electrode 741a and/or the second lead electrode 742a to only one surface of the multilayer ceramic electronic component 700 according to the present disclosure in the third direction (Z direction).

The descriptions of a maximum value W14 of a width of the first lead electrode 741a and/or the second lead electrode 742a in the second direction (Y direction), a maximum value W13 of a width of the ceramic body 710 in the second direction (Y direction), a maximum value H14 of a height of the first lead electrode 741a and the second lead electrode 742a in the third direction (Z direction), a maximum value H13 of the ceramic body 710 in the third direction (Z direction), and heights and widths of the first ceramic layer 741b and the second ceramic layer 742b in the third direction (Z direction) and the second direction (Y direction) are the same as those described above, and thus will be omitted.

In the example described above, the multilayer ceramic electronic component 700 of the present disclosure may include a first terminal electrode 751a connected to the first lead electrode 741a, and a second terminal electrode 752a connected to the second lead electrode 742a.

According to a modified form of the example, the first connection portion 741 of the multilayer ceramic electronic component 700 of the present disclosure may include a first auxiliary electrode 741c disposed to be in contact with a first lead electrode 741a, and the second connection portion 742 may include a second auxiliary electrode 742c disposed to be in contact with a second lead electrode 742a. The multilayer ceramic electronic component 700 of the present disclosure may include a first terminal electrode 751a connected to the first lead electrode 741a, and a second terminal electrode 752a connected to the second lead electrode 742a. In this case, the first terminal electrode 751a and the second terminal electrode 752a may be disposed to be spaced apart from each other on a surface from which the first lead electrode 741a and the second lead electrode 742a are led.

In another modified form of the example, the multilayer ceramic electronic component 700 of the present disclosure may have at least portions of the first lead electrode 741a and the second lead electrode 742a exposed in the first direction (X direction), and may include a first terminal electrode 751a disposed to cover the first lead electrode 741a and the first ceramic layer 741b, and a second terminal electrode 752a disposed to cover the second lead electrode 742a and the second ceramic layer 742b.

In addition, the multilayer ceramic electronic component 700 according to the present disclosure may include plating layers disposed on each lead electrode, respectively. The descriptions of the lead electrode, the ceramic layer, the auxiliary electrode, the terminal electrode, and the plating layer are the same as those described above, and thus will be omitted.

In another modified form of the present example, a first lead electrode 841a and a second lead electrode 842a of a multilayer ceramic electronic component 800 of the present disclosure may be lead out to opposite surfaces of a ceramic body 810 in the third direction (Z direction). FIGS. 52 through 57 are schematic views illustrating a multilayer ceramic electronic component 800 according to the present example. Referring to FIGS. 52 through 57, in the multilayer ceramic electronic component 800 according to the present exemplary embodiment, a first connection portion 841 and a second connection portion 842 may be disposed on opposite surfaces of the ceramic body 810 in the first direction (X direction) where a first margin portion 831 and a second margin portion 832 are disposed on opposite surfaces in the third direction (Z direction). Here, the first connection portion 841 may include a first lead electrode 841a and a first ceramic layer 841b, the second connection portion 842 may include a second lead electrode 842a and a second ceramic layer 842b, and the first lead electrode 841a and the second lead electrode 842a may be respectively lead out to opposite surfaces in the third direction (Z direction).

In the present example, a maximum value W16 of a width of the first lead electrode 841a and/or the second lead electrode 842a of the multilayer ceramic electronic component 800 in the second direction (Y direction) may be smaller than a maximum value W15 of a width of a ceramic body 810 in the second direction (Y direction).

In one example, a maximum value H16 of a height of the first lead electrode 841a and the second lead electrode 842a of the multilayer ceramic electronic component 800 according to the present disclosure in the third direction (Z direction) may be equal to a maximum value H15 of a height of the ceramic body 810 in the third direction (Z direction). In the present specification, the meaning of a certain length, width and/or height being the same is premised on including an error range. Here, the error range may mean |H16−H15|/H16 or |H16−H15|/H15 to be, for example, 3% or less, 2% or less, or 1% or less, but is not limited thereto. The descriptions of a maximum value W16 of a width of the first lead electrode 841a and/or the second lead electrode 842a in the second direction (Y direction), a maximum value W15 of a width of the ceramic body 810 in the second direction (Y direction), a maximum value H16 of a height of the first lead electrode 841a and the second lead electrode 842a in the third direction (Z direction), a maximum value H15 of the ceramic body 810 in the third direction (Z direction), and heights and widths of the first ceramic layer 841b and the second ceramic layer 842b in the third direction (Z direction) and the second direction (Y direction) are the same as those described above, and thus will be omitted.

The modified form described above may also be applied to the present exemplary embodiment. FIGS. 55A through 57 are schematic views illustrating a modified form of the first connection portion 841. The shape and structure of the first connection portion 841 illustrated in FIGS. 55A through 57 may be equally applied to all of the connection portions of the present exemplary embodiment arranged at four locations. Referring to FIGS. 55A through 57, the first connection portion 841 of the multilayer ceramic electronic component 800 according to the present modified form may include a first auxiliary electrode disposed to be in contact with a first lead electrode 841a, or may include a first terminal electrode connected to the first lead electrode 841a, or may include the first auxiliary electrode and the first terminal electrode together.

In addition, the multilayer ceramic electronic component 800 may have at least portions of the first lead electrode 841a and the second lead electrode 842a exposed in the first direction (X direction), and may include a first terminal electrode disposed to cover the first lead electrode 841a and the first ceramic layer, and a second terminal electrode disposed to cover the second lead electrode 842a and the second ceramic layer. In addition, the multilayer ceramic electronic component 800 according to the present disclosure may include plating layers disposed on each lead electrode, respectively. The descriptions of the lead electrode, the ceramic layer, the auxiliary electrode, the terminal electrode, and the plating layer are the same as those described above, and thus will be omitted.

Figure 58:
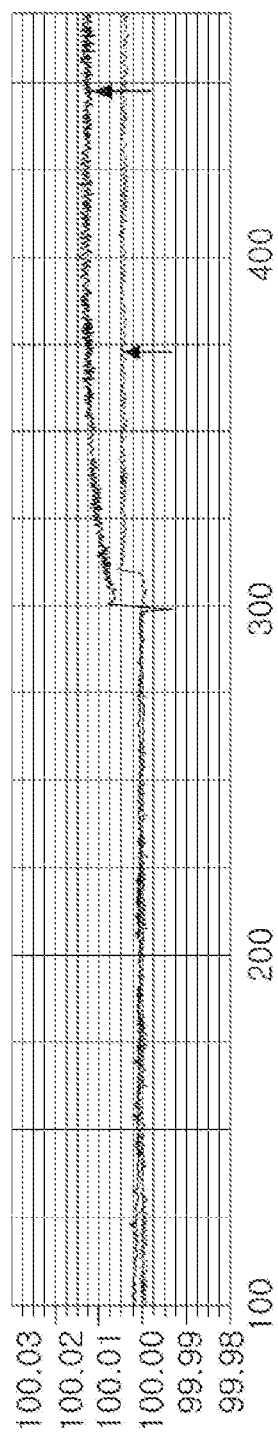
FIG. 58 is a graph measuring a moisture absorption rate of a multilayer ceramic electronic component according to an exemplary embodiment in the present disclosure and a comparative example.

FIG. 58 illustrates a result of testing moisture resistance of a multilayer ceramic electronic component according to the present disclosure and a component having a conventional MLCC structure. The moisture resistance was evaluated by a rate of change in weight measured after 300 minutes or more elapsed in an environment at a temperature of 85° C. and relative humidity of 85% as a moisture absorption rate. In a comparative example, a mass-produced chip of size 1005 of Samsung Electro-Mechanics was used, in which an external electrode was formed on a surface of a ceramic body in a length direction (temperature characteristic X7R and capacity 220.0 nF), and in an exemplary embodiment, a prototype chip manufactured by forming a first connection portion and a second connection portion without forming the external electrode on the ceramic body of the 1005 size chip and sintering the ceramic body once was used.

Referring to FIG. 58, the component of the comparative example exhibited a moisture absorption rate of 0.013 wt %, but it may be seen that the multilayer ceramic electronic component according to the present disclosure exhibits a moisture absorption rate of 0.004 wt % and the moisture absorption rate decreases to ⅓ or less. As a result, it may be seen that the moisture resistance of the multilayer ceramic electronic component according to the present disclosure is greatly improved.

As set forth above, according to the exemplary embodiments in the present disclosure, the multilayer ceramic electronic component having excellent moisture resistance reliability may be provided.

Further, the multilayer ceramic electronic component capable of increasing process efficiency by simplifying the production process may be provided.

Further, the multilayer ceramic electronic component in which a product may be miniaturized may be provided.

However, various and beneficial advantages and effects of the present disclosure are not limited to the contents described above, and may be more easily understood in a process of describing exemplary embodiments in the present disclosure.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
   a ceramic body including a laminate body including first and second surfaces opposing each other in a first direction, third and fourth surfaces opposing each other in a second direction, and fifth and sixth surfaces opposing each other in a third direction, and including a dielectric layer, and a first internal electrode and a second internal electrode stacked in the third direction with the dielectric layer interposed therebetween, a first margin portion disposed on the third surface of the laminate body, and a second margin portion disposed on the fourth surface of the laminate body;
   a first connection portion disposed on the first surface of the laminate body; and
   a second connection portion disposed on the second surface of the laminate body,
   wherein the first connection portion includes a first lead electrode connected to the first internal electrode and a first ceramic layer disposed on the first lead electrode,
   the second connection portion includes a second lead electrode connected to the second internal electrode and a second ceramic layer disposed on the second lead electrode,
   the first lead electrode is led out to one surface of the first connection portion in the third direction, and the second lead electrode is led out to one surface of the second connection portion in the third direction,
   among the first to sixth surfaces of the laminate body, the first lead electrode is disposed only on the first surface of the laminate body,
   among the first to sixth surfaces of the laminate body, the second lead electrode is disposed only on the second surface of the laminate body,
   the first ceramic layer covers at least a portion of the first lead electrode, the second ceramic layer covers at least a portion of the second lead electrode,
a maximum value of a width of the first lead electrode and/or the second lead electrode in the second direction is smaller than a maximum value of a width of the ceramic body in the second direction, and
a maximum value of a height of the first lead electrode and/or the second lead electrode in the third direction is smaller than a maximum value of a height of the ceramic body in the third direction.

2. The multilayer ceramic electronic component of claim 1, wherein the first internal electrode and the second internal electrode include one or more conductive metals selected from the group consisting of silver (Ag), palladium (Pd), gold (Au), platinum (Pt), nickel (Ni), copper (Cu), tin (Sn), tungsten (W), titanium (Ti), and alloys thereof.

3. The multilayer ceramic electronic component of claim 1, wherein the first lead electrode and the second lead electrode include one or more conductive metals selected from the group consisting of silver (Ag), palladium (Pd), gold (Au), platinum (Pt), nickel (Ni), copper (Cu), tin (Sn), tungsten (W), titanium (Ti), and alloys thereof.

4. The multilayer ceramic electronic component of claim 1, wherein the first internal electrode, the second internal electrode, the first lead electrode, and the second lead electrode include one or more conductive metals selected from the group consisting of silver (Ag), palladium (Pd), gold (Au), platinum (Pt), nickel (Ni), copper (Cu), tin (Sn), tungsten (W), titanium (Ti), and alloys thereof.

5. The multilayer ceramic electronic component of claim 1, wherein the first ceramic layer and/or the second ceramic layer includes a component represented by $(Ba_{1-x}Ca_x)(Ti_{1-y}(Zr, Sn, Hf)_y)O_3$ ($0 \leq x \leq 1$ and $0 \leq y \leq 0.5$).

6. The multilayer ceramic electronic component of claim 1, wherein the first connection portion includes a first auxiliary electrode disposed to be in contact with the first lead electrode,
the second connection portion includes a second auxiliary electrode disposed to be in contact with the second lead electrode,
the first auxiliary electrode is led out together with the first lead electrode, and
the second auxiliary electrode is led out together with the second lead electrode.

7. The multilayer ceramic electronic component of claim 6, further comprising a first terminal electrode connected to the first lead electrode, and a second terminal electrode connected to the second lead electrode,
wherein the first terminal electrode and the second terminal electrode are disposed to be spaced apart from each other on a surface from which the first and second lead electrodes are led.

8. The multilayer ceramic electronic component of claim 1, further comprising a first terminal electrode connected to the first lead electrode, and a second terminal electrode connected to the second lead electrode,
wherein the first terminal electrode and the second terminal electrode are disposed to be spaced apart from each other on a surface of the capacitor body from which the first and second lead electrodes are led.

9. The multilayer ceramic electronic component of claim 1, further comprising a first terminal electrode connected to the first lead electrode, and a second terminal electrode connected to the second lead electrode,
wherein the first terminal electrode and the second terminal electrode are disposed to be spaced apart from each other on a surface from which the first and second lead electrodes are led.

10. The multilayer ceramic electronic component of claim 9, further comprising:
a first plating layer disposed on the first lead electrode; and
a second plating layer disposed on the second lead electrode.

11. The multilayer ceramic electronic component of claim 1, further comprising:
a first plating layer disposed on the first lead electrode; and
a second plating layer disposed on the second lead electrode.

12. The multilayer ceramic electronic component of claim 1, further comprising:
a first connection electrode disposed to cover the first lead electrode and the first ceramic layer; and
a second connection electrode disposed to cover the second lead electrode and the second ceramic layer,
wherein at least portions of the first lead electrode and the second lead electrode are exposed in the first direction.

13. The multilayer ceramic electronic component of claim 1, wherein the first lead electrode and the second lead electrode are led out to opposite surfaces of the ceramic body in the third direction.

14. The multilayer ceramic electronic component of claim 1, wherein a length in the first direction is greater than a width in the second direction.

15. The multilayer ceramic electronic component of claim 1, wherein a length in the first direction is smaller than a width in the second direction.

16. A multilayer ceramic electronic component comprising:
a ceramic body including a laminate body including first and second surfaces opposing each other in a first direction, third and fourth surfaces opposing each other in a second direction, and fifth and sixth surfaces opposing each other in a third direction, and including a dielectric layer, and a first internal electrode and a second internal electrode stacked in the second direction with the dielectric layer interposed therebetween, a first margin portion disposed on the third surface of the laminate body, and a second margin portion disposed on the fourth surface of the laminate body;
a first connection portion disposed on the first surface of the laminate body; and
a second connection portion disposed on the second surface of the laminate body,
wherein the first connection portion includes a first lead electrode connected to the first internal electrode and a first ceramic layer disposed on the first lead electrode,
the second connection portion includes a second lead electrode connected to the second internal electrode and a second ceramic layer disposed on the second lead electrode,
the first lead electrode is led out to one surface of the first connection portion in the third direction,
the second lead electrode is led out to one surface of the second connection portion in the third direction,
among the first to sixth surfaces of the laminate body, the first lead electrode is disposed only on the first surface of the laminate body, and among the first to sixth surfaces of the laminate body, the second lead electrode is disposed only on the second surface of the laminate body.

17. The multilayer ceramic electronic component of claim 16, wherein a maximum value of a width of the first lead electrode and/or the second lead electrode in the second direction is smaller than a maximum value of a width of the ceramic body in the second direction.

18. The multilayer ceramic electronic component of claim 16, wherein a maximum value of a height of the first lead electrode and/or the second lead electrode in the third direction is a maximum value or less of a height of the ceramic body in the third direction.

19. The multilayer ceramic electronic component of claim 16, wherein a length in the first direction is greater than a width in the second direction.

20. The multilayer ceramic electronic component of claim 16, wherein a length in the first direction is smaller than a width in the second direction.

21. A multilayer ceramic electronic component comprising:
a ceramic body including a laminate body including first and second surfaces opposing each other in a first direction, third and fourth surfaces opposing each other in a second direction, and fifth and sixth surfaces opposing each other in a third direction and having a first internal electrode and a second internal electrode stacked in the third direction with a dielectric layer interposed therebetween, the first internal electrode extending from the first surface of the laminate body and the second internal electrode extending from the second surface of the laminate body;
a first connection portion including a first lead electrode connected to the first internal electrode, and a first ceramic layer covering the first lead electrode and being in contact with the ceramic body; and
a second connection portion including a second lead electrode connected to the second internal electrode, and a second ceramic layer covering the second lead electrode and being in contact with the ceramic body,
wherein the first lead electrode includes one end led out to one surface of the first connection portion, and the second lead electrode includes one end led out to one surface of the second connection portion,
the first ceramic layer is in contact with the first surface of the laminate body,
the second ceramic layer is in contact with the second surface of the laminate body,
a maximum value of a width of the first lead electrode and/or the second lead electrode in the second direction is smaller than a maximum value of a width of the ceramic body in the second direction, and
a maximum value of a height of the first lead electrode and/or the second lead electrode in the third direction is smaller than a maximum value of a height of the ceramic body in the third direction.

22. The multilayer ceramic electronic component of claim 21, wherein the capacitor body further includes first and second margin portions respectively disposed on the third and fourth surfaces of the laminate body, and
the first and second margin portions include a ceramic material.

23. The multilayer ceramic electronic component of claim 22, wherein the first and second margin portions are in contact with the first and second ceramic layers.

24. The multilayer ceramic electronic component of claim 21, further comprising a first terminal electrode connected to the one end of the first lead electrode and a second terminal electrode connected to the one end of the second lead electrode.

25. The multilayer ceramic electronic component of claim 21, wherein the first lead electrode includes another end led out to another surface of the first connection portion, and the second lead electrode includes another end led out to another surface of the second connection portion.

26. The multilayer ceramic electronic component of claim 21, wherein among the one end of the first lead electrode and another end of the first lead electrode opposing the one end of the first lead electrode, the one end of the first lead electrode is the only end led out to the first connection portion, and
among the one end of the second lead electrode and another end of the second lead electrode opposing the one end of the second lead electrode, the one end of the second lead electrode is the only end led out to the second connection portion.

27. The multilayer ceramic electronic component of claim 21, wherein the first lead electrode covers only a portion of the first surface of the laminate body, and the second lead electrode covers only a portion of the second surface of the laminate body.

28. A method of manufacturing a multilayer ceramic electronic component, the method comprising:
forming a body including a laminate body having a first internal conductive paste layer and a second internal conductive paste layer with an internal ceramic paste layer interposed therebetween;
forming a first conductive paste layer on one surface of the body, and a first ceramic paste layer covering the first conductive paste layer and being in contact with the body;
forming a second conductive paste layer on another surface of the body, and a second ceramic paste layer covering the second conductive paste layer and being in contact with the body; and
simultaneously sintering the body, the first conductive paste layer, the first ceramic paste layer, the second conductive paste layer, and the second ceramic paste layer,
wherein a first lead electrode, formed of the first conductive paste layer by the sintering, is connected to a first internal electrode, formed of the first conductive paste layer by the sintering,
a second lead electrode, formed of the second conductive paste layer by the sintering, is connected to a second internal electrode, formed of the second conductive paste layer by the sintering,
the first lead electrode includes an end exposed from a first ceramic layer, formed of the first ceramic paste layer by the sintering, and the second lead electrode includes an end exposed from a second ceramic layer, formed of the second ceramic paste layer by the sintering,
the laminate body, after the sintering, includes first and second surfaces opposing each other in a first direction, third and fourth surfaces opposing each other in a second direction, and fifth and sixth surfaces opposing each other in a third direction,
a ceramic body, formed of the body by the sintering, includes the first internal electrode and the second internal electrode stacked in the third direction with a dielectric layer formed of the internal ceramic paste and interposed therebetween, a first margin portion disposed on the third surface, and a second margin portion disposed on the fourth surface, among the first to sixth surfaces of the laminate body, the first lead electrode is disposed only on the first surface of the laminate body, among the first to sixth surfaces of the laminate body, the second lead electrode is disposed only on the second surface of the laminate body, the first ceramic layer covers at least a portion of the first lead electrode, the second ceramic layer covers at least a portion of the second lead electrode, a maximum value of a width of the first lead electrode and/or the second lead electrode in the second direction is smaller than a maximum value of a width of the ceramic body in the second direction, and a maximum value of a height of the first lead electrode and/or the second lead electrode in the third direction is smaller than a maximum value of a height of the ceramic body in the third direction.

29. The method of claim 28, wherein forming the body further includes:

prior to the forming the first conductive paste layer, the first ceramic paste layer, the second conductive paste layer, and the second ceramic paste layer, forming first and margin paste portions on opposing surfaces of the laminate body, respectively, and the first and margin paste portions are simultaneously sintered with the body, the first conductive paste layer, the first ceramic paste layer, the second conductive paste layer, and the second ceramic paste layer, such that the first and margin paste portions are formed as the first and second margin portions, respectively, by the sintering.

30. The method of claim 28, further comprising forming a first terminal electrode connected to the end of the first lead electrode and a second terminal electrode connected to the end of the second lead electrode.

* * * * *